(12) United States Patent
Kasturi et al.

(10) Patent No.: US 11,741,384 B2
(45) Date of Patent: Aug. 29, 2023

(54) ADAPTABLE SYSTEMS AND METHODS FOR DISCOVERING INTENT FROM ENTERPRISE DATA

(71) Applicant: Predii Inc., Palo Alto, CA (US)

(72) Inventors: Tilak B Kasturi, Palo Alto, CA (US); Hieu Ho, San Jose, CA (US); Aniket Dalal, Santa Clara, CA (US)

(73) Assignee: PREDII, INC., Palo Alto, CA (US)

( * ) Notice: Subject to any disclaimer, the term of this patent is extended or adjusted under 35 U.S.C. 154(b) by 796 days.

(21) Appl. No.: 16/601,525

(22) Filed: Oct. 14, 2019

(65) Prior Publication Data

US 2020/0118014 A1  Apr. 16, 2020

Related U.S. Application Data

(60) Provisional application No. 62/745,285, filed on Oct. 13, 2018.

(51) Int. Cl.
*G06N 20/00* (2019.01)
*G06N 5/045* (2023.01)
*G06F 16/28* (2019.01)
*G06F 40/30* (2020.01)
*G06N 7/01* (2023.01)

(52) U.S. Cl.
CPC .......... *G06N 5/045* (2013.01); *G06F 16/283* (2019.01); *G06F 40/30* (2020.01); *G06N 7/01* (2023.01); *G06N 20/00* (2019.01)

(58) Field of Classification Search
CPC ........ G06N 5/045; G06N 20/00; G06N 7/005; G06F 16/283
See application file for complete search history.

(56) References Cited

U.S. PATENT DOCUMENTS

| 6,493,723 B1* | 12/2002 | Busche | G06Q 10/08 707/999.104 |
| 9,092,802 B1* | 7/2015 | Akella | G06F 40/242 |
| 9,672,497 B1* | 6/2017 | Lewis | G06F 40/284 |
| 2006/0106595 A1* | 5/2006 | Brockett | G06F 40/45 704/9 |
| 2006/0195321 A1* | 8/2006 | Deligne | G10L 15/065 704/E15.009 |

(Continued)

OTHER PUBLICATIONS

PCT/US2019-056161—SearchReport by Lee Young, dated Dec. 6, 2019; 3 pages.

(Continued)

*Primary Examiner* — Alford W Kindred
*Assistant Examiner* — Tiffany Thuy Bui
(74) *Attorney, Agent, or Firm* — Alford Law Group, Inc.; William E. Alford

(57) ABSTRACT

Methods for analyzing data are disclosed. One disclosed method includes defining an intent language model for domain specific meaning behind historical enterprise data produced during operation of an enterprise; applying the historical enterprise data to build the intent language model; extracting intent element features of interest from the enterprise data to generate domain specific intent metadata; and storing the domain specific intent metadata into a database. The historical enterprise data includes findings and observations by one or more human experts in one or more service records and data associated with a problem.

15 Claims, 30 Drawing Sheets

(56) References Cited

U.S. PATENT DOCUMENTS

| | | | |
|---|---|---|---|
| 2008/0270120 A1* | 10/2008 | Pestian | G16H 40/20 705/2 |
| 2009/0204237 A1* | 8/2009 | Sustaeta | G06Q 10/04 700/106 |
| 2010/0293451 A1* | 11/2010 | Carus | G06N 20/00 715/256 |
| 2012/0330869 A1* | 12/2012 | Durham | G06N 5/022 706/16 |
| 2014/0358828 A1 | 12/2014 | Phillipps et al. | |
| 2015/0278241 A1* | 10/2015 | Bates-Haus | G06F 16/215 707/692 |
| 2017/0169101 A1* | 6/2017 | Walia | G06Q 30/016 |
| 2018/0191867 A1 | 7/2018 | Siebel et al. | |
| 2019/0384855 A1* | 12/2019 | Bhattacharya | G06F 40/40 |

OTHER PUBLICATIONS

PCT/US2019-056161—Opinion by Lee Young, dated Dec. 6, 2019; 3 pages.

\* cited by examiner

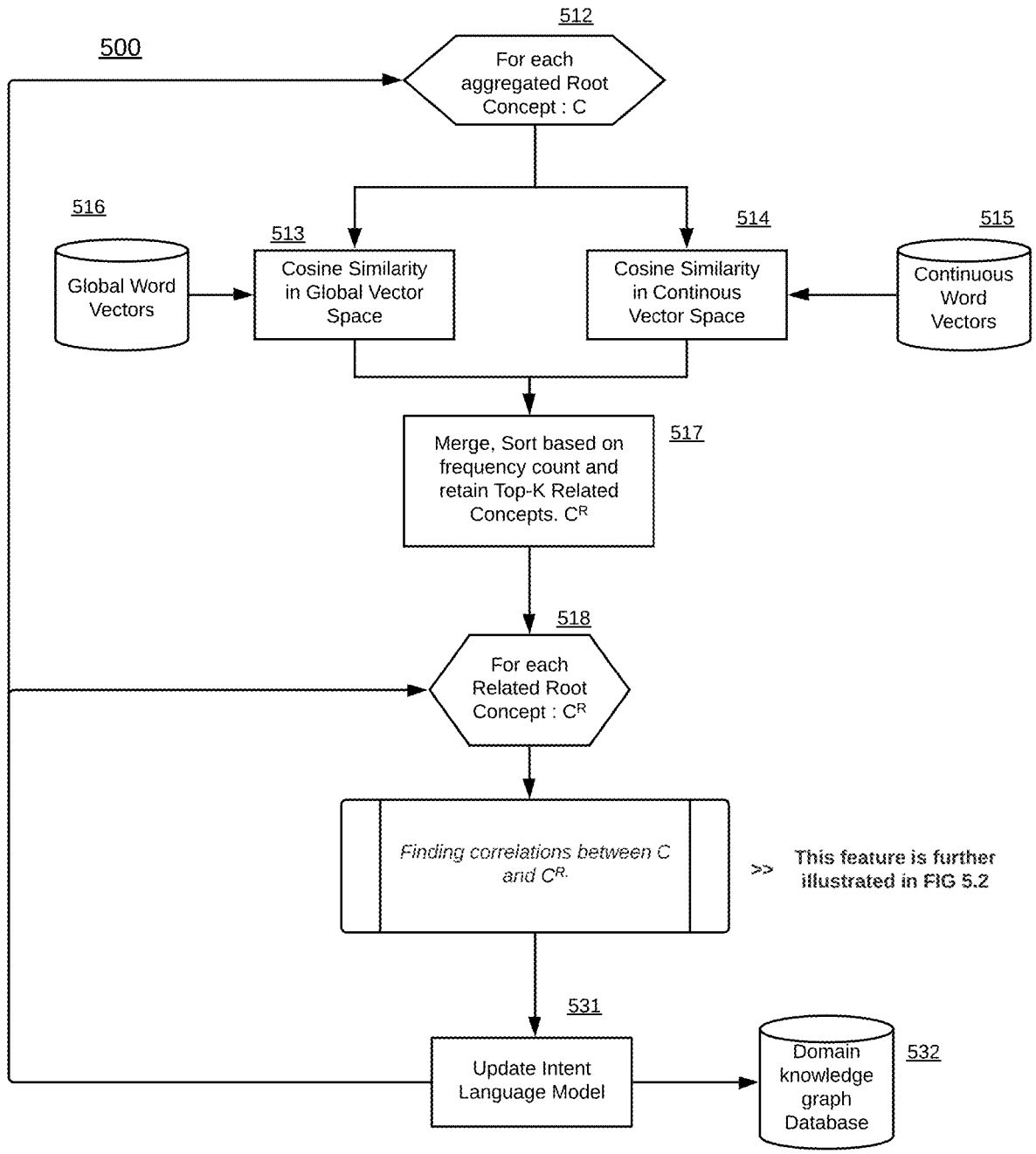
FIG. 5.1

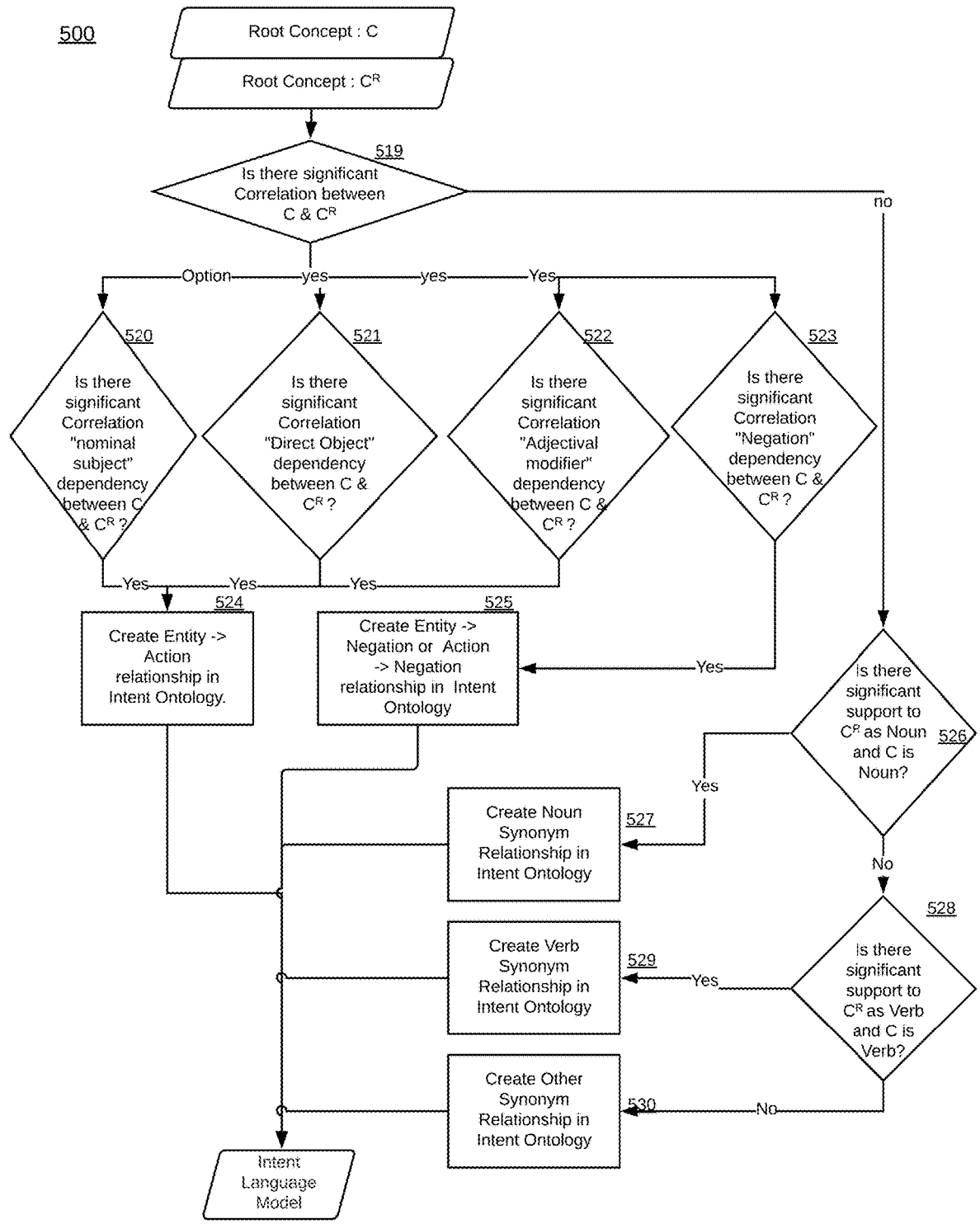
FIG. 5.2

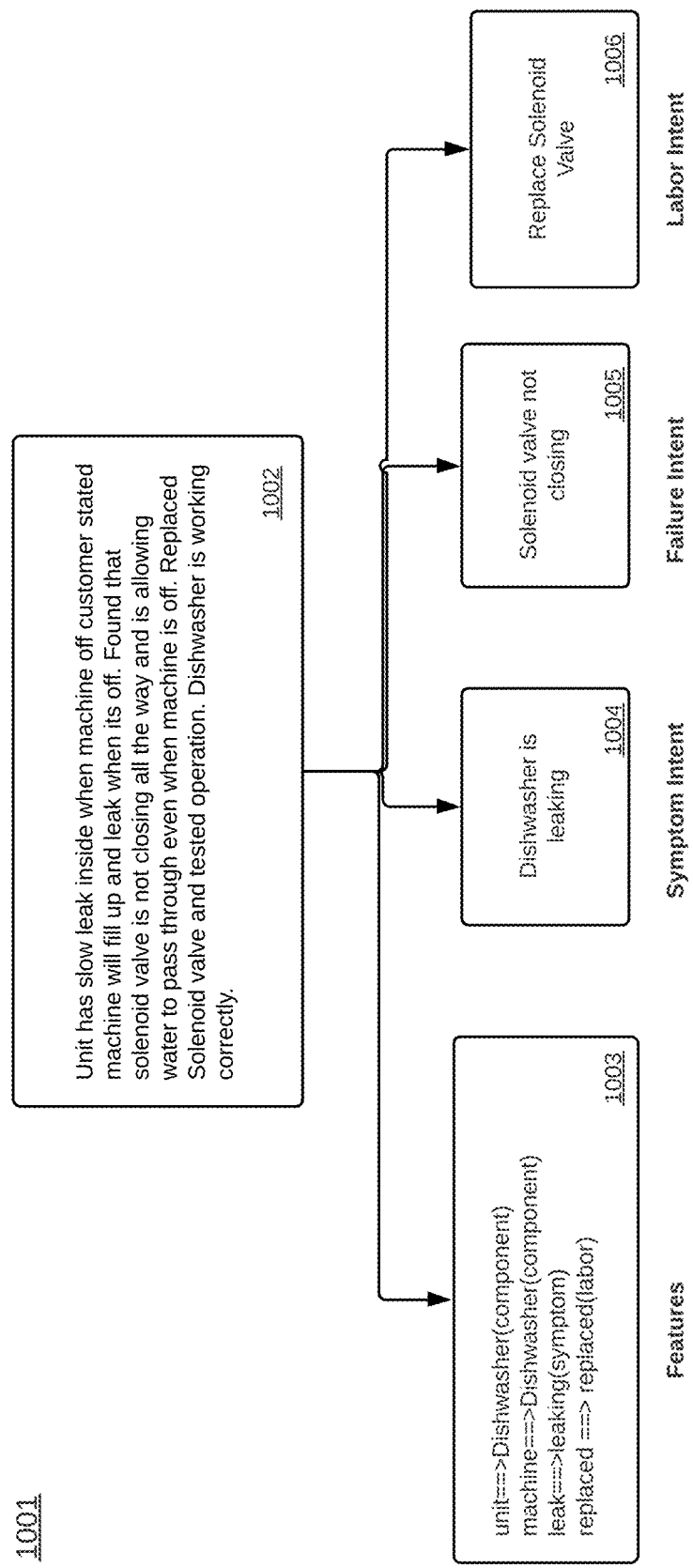
FIG. 10.1

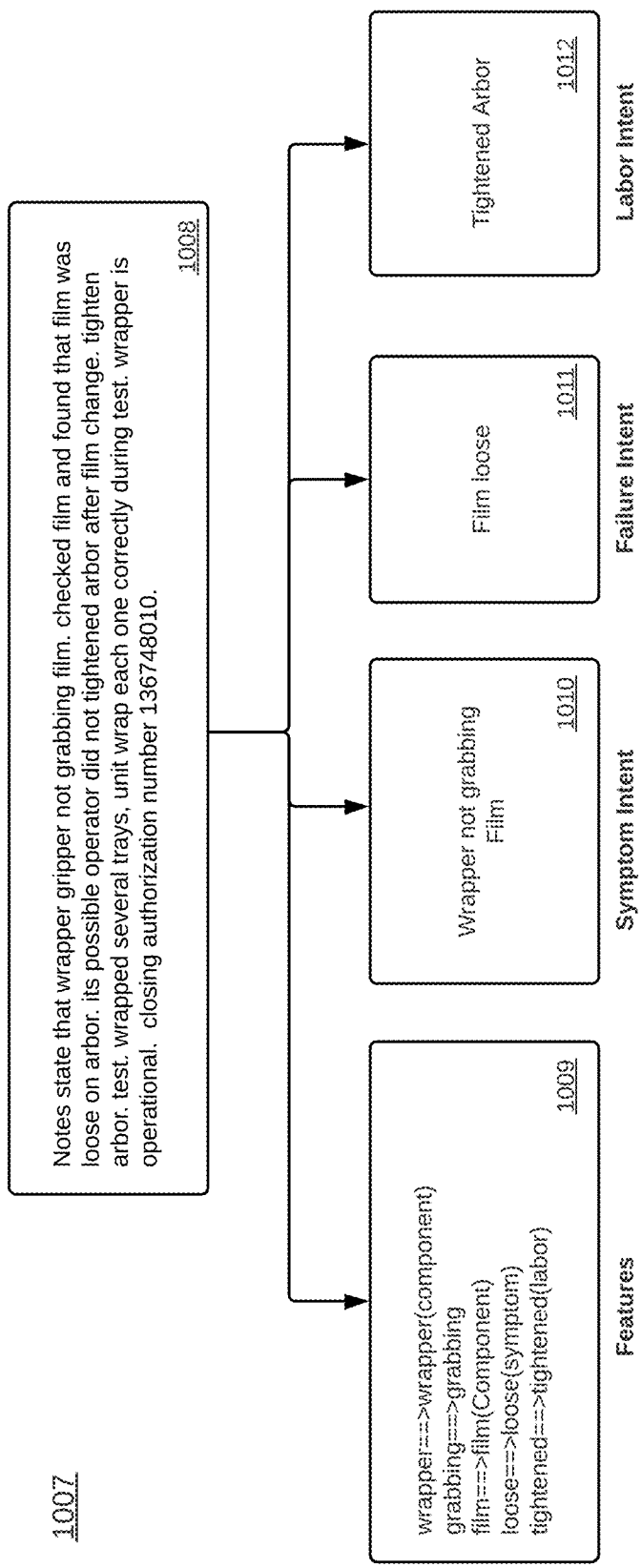
FIG. 10.2

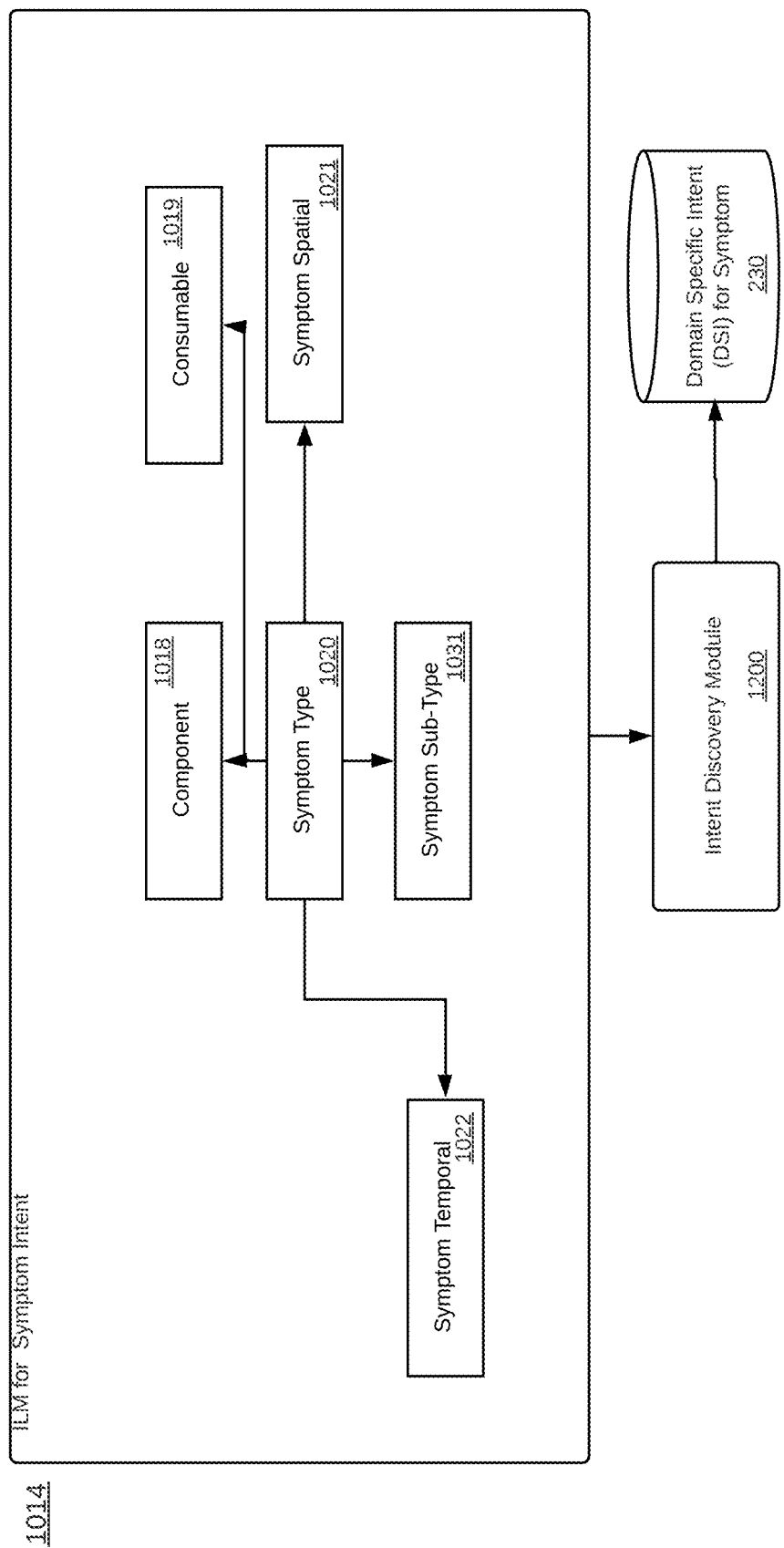
FIG. 10.3

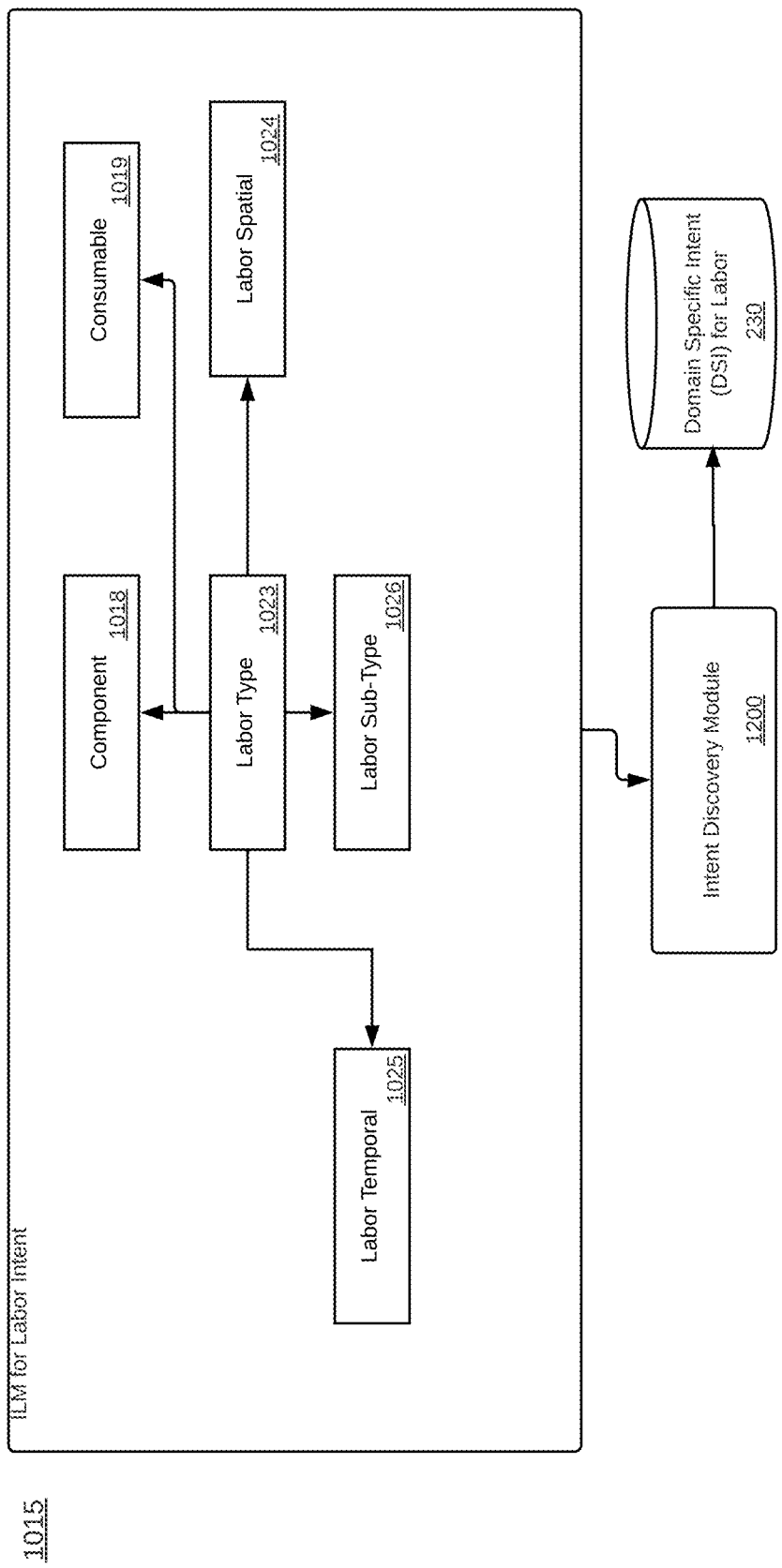
FIG. 10.4

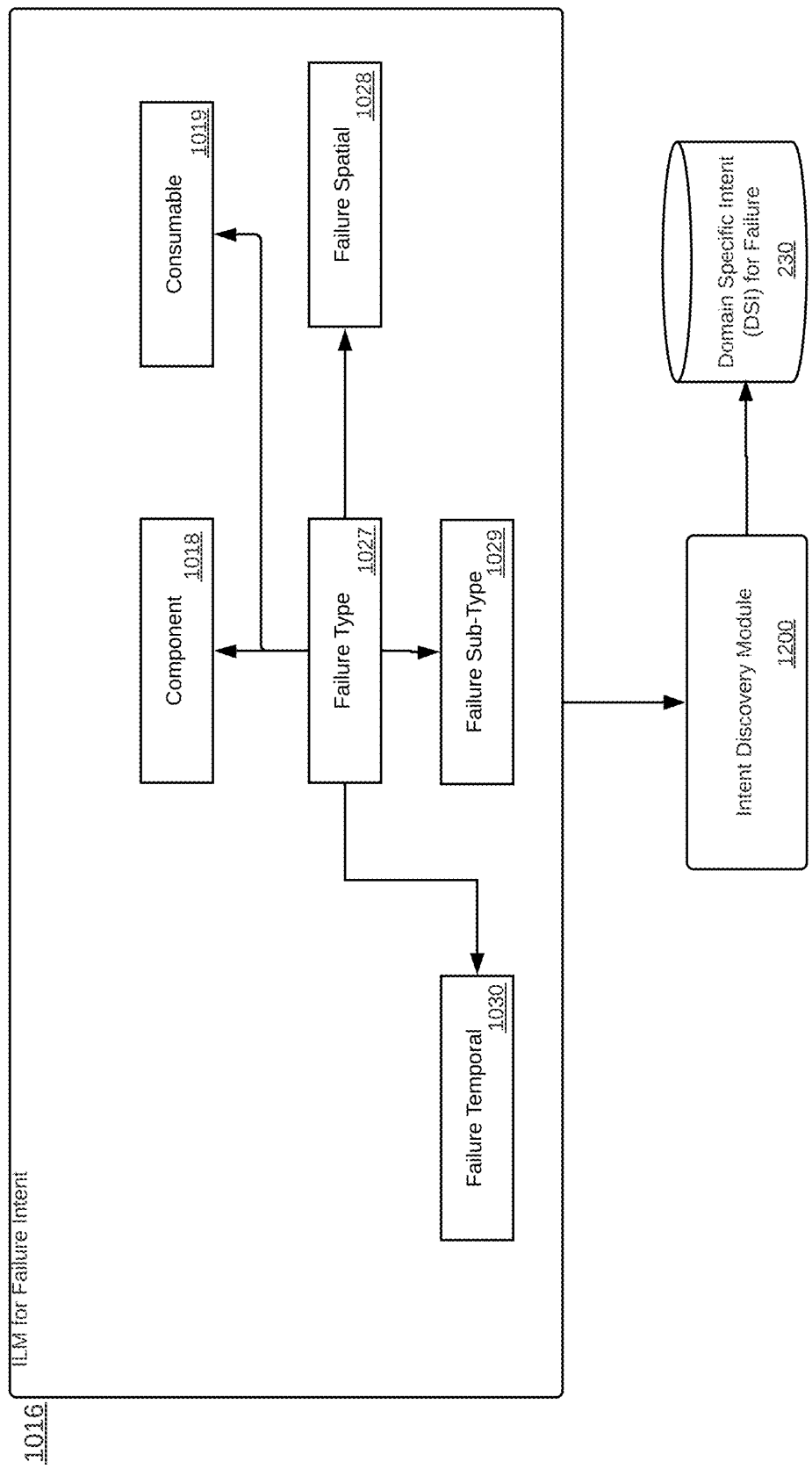
FIG. 10.5

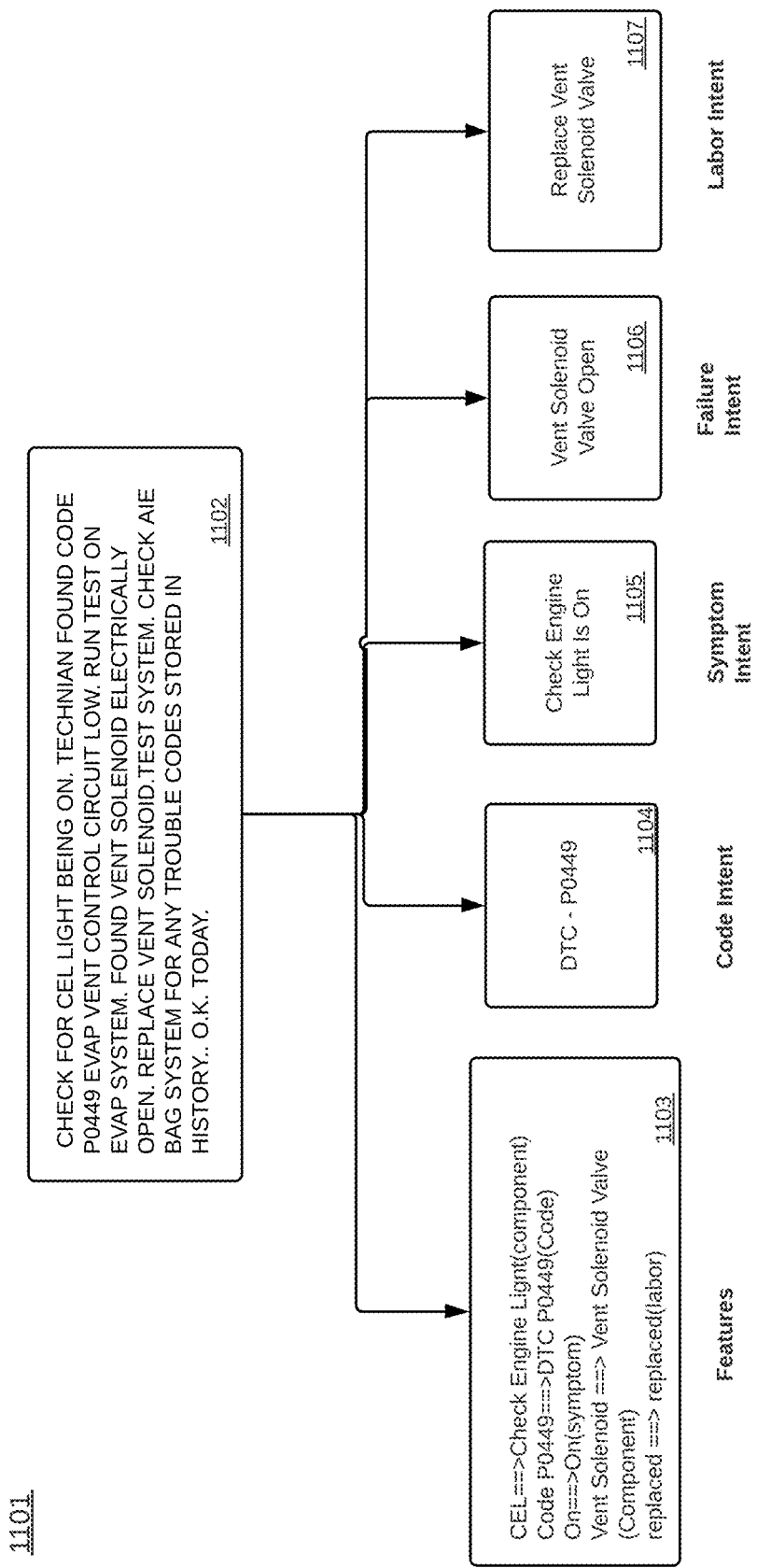
FIG. 11.1

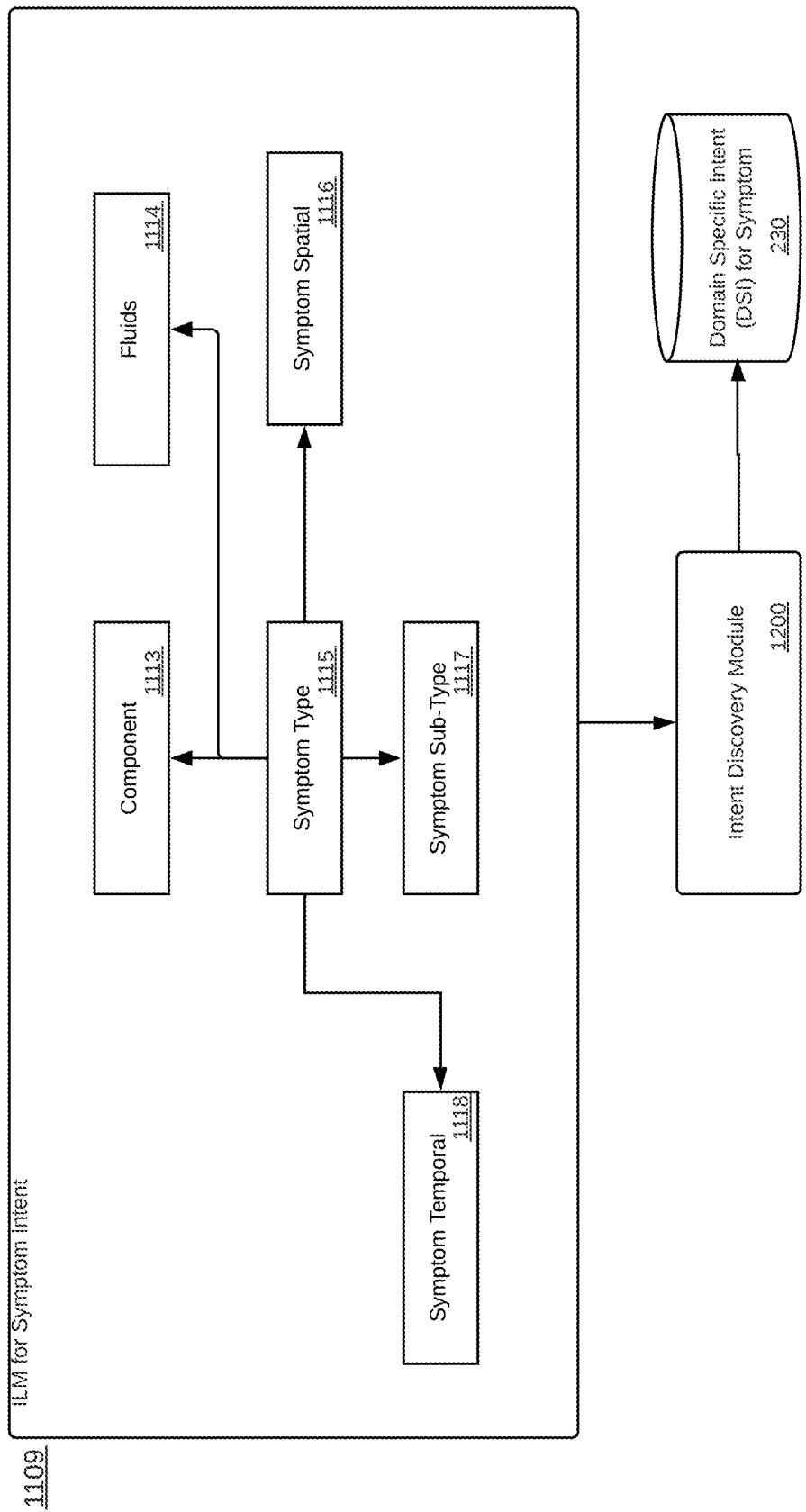
FIG. 11.2

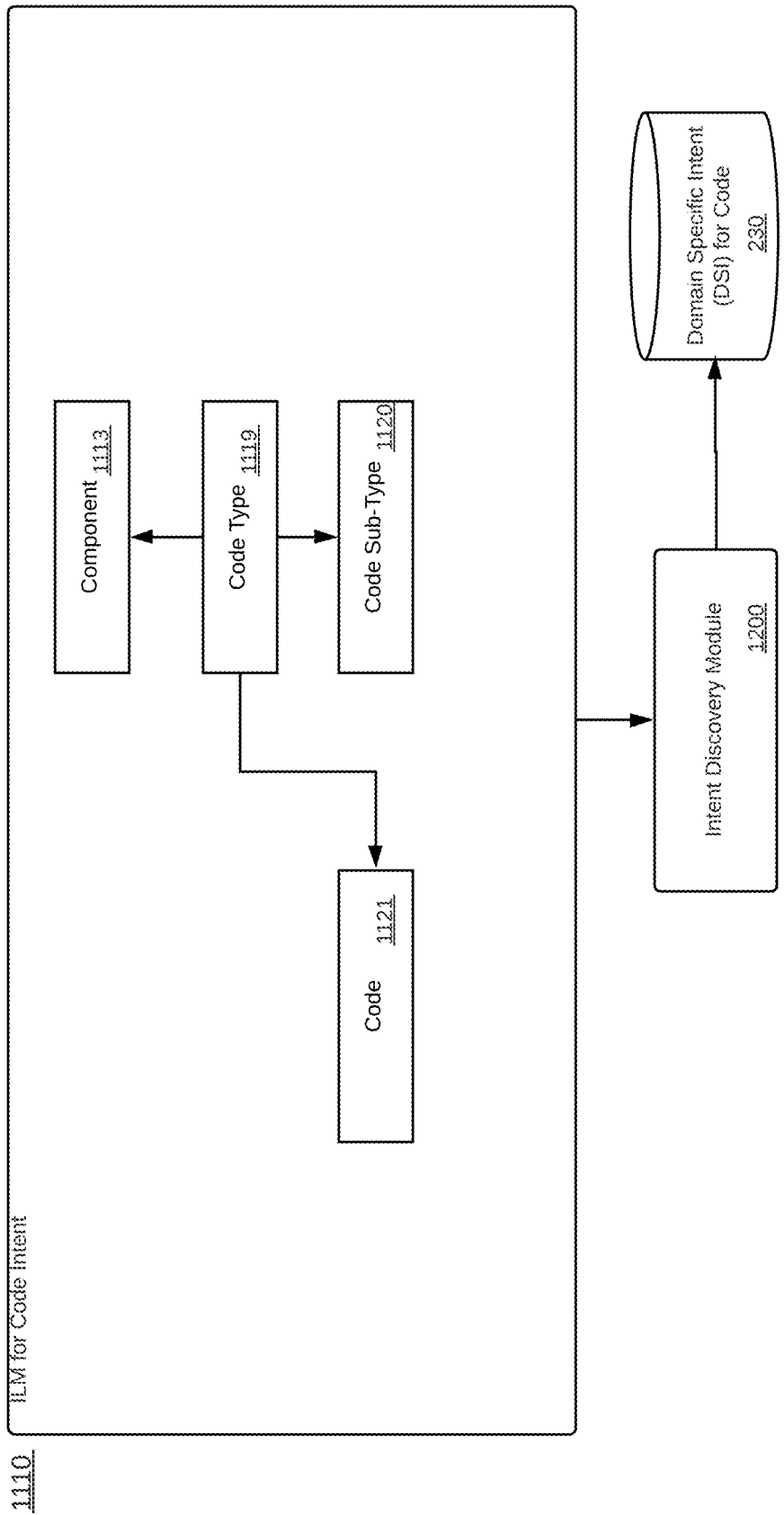
FIG. 11.3

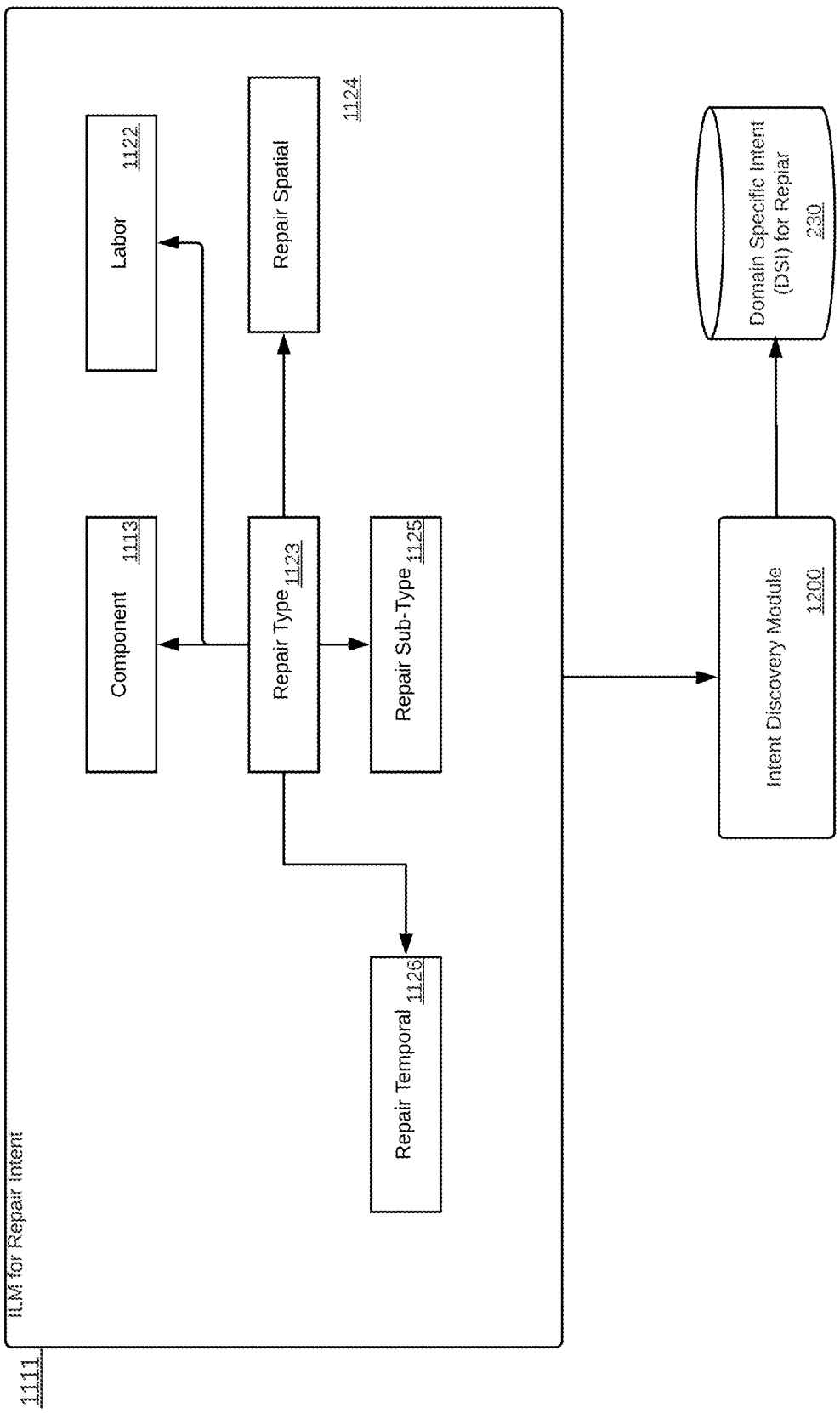
FIG. 11.4

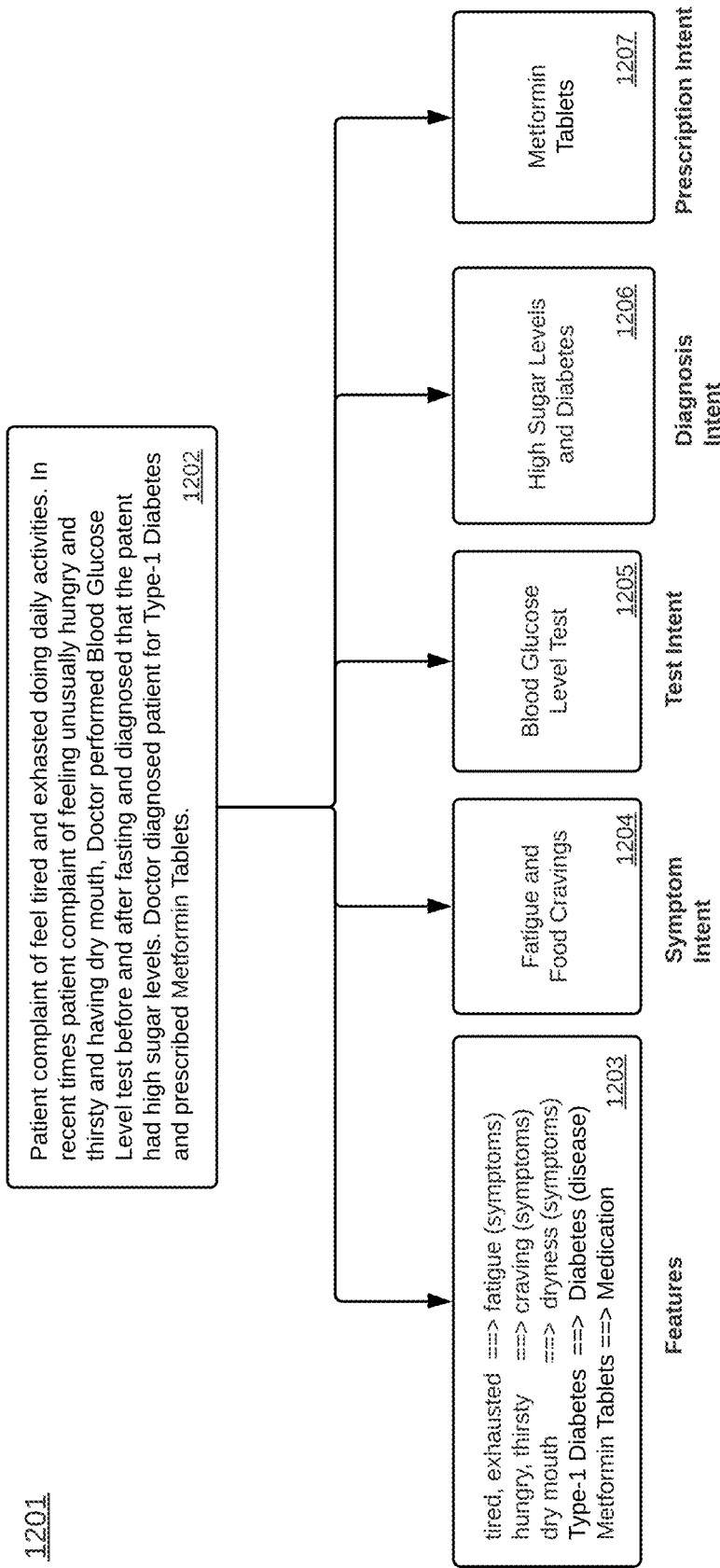
FIG. 12.1

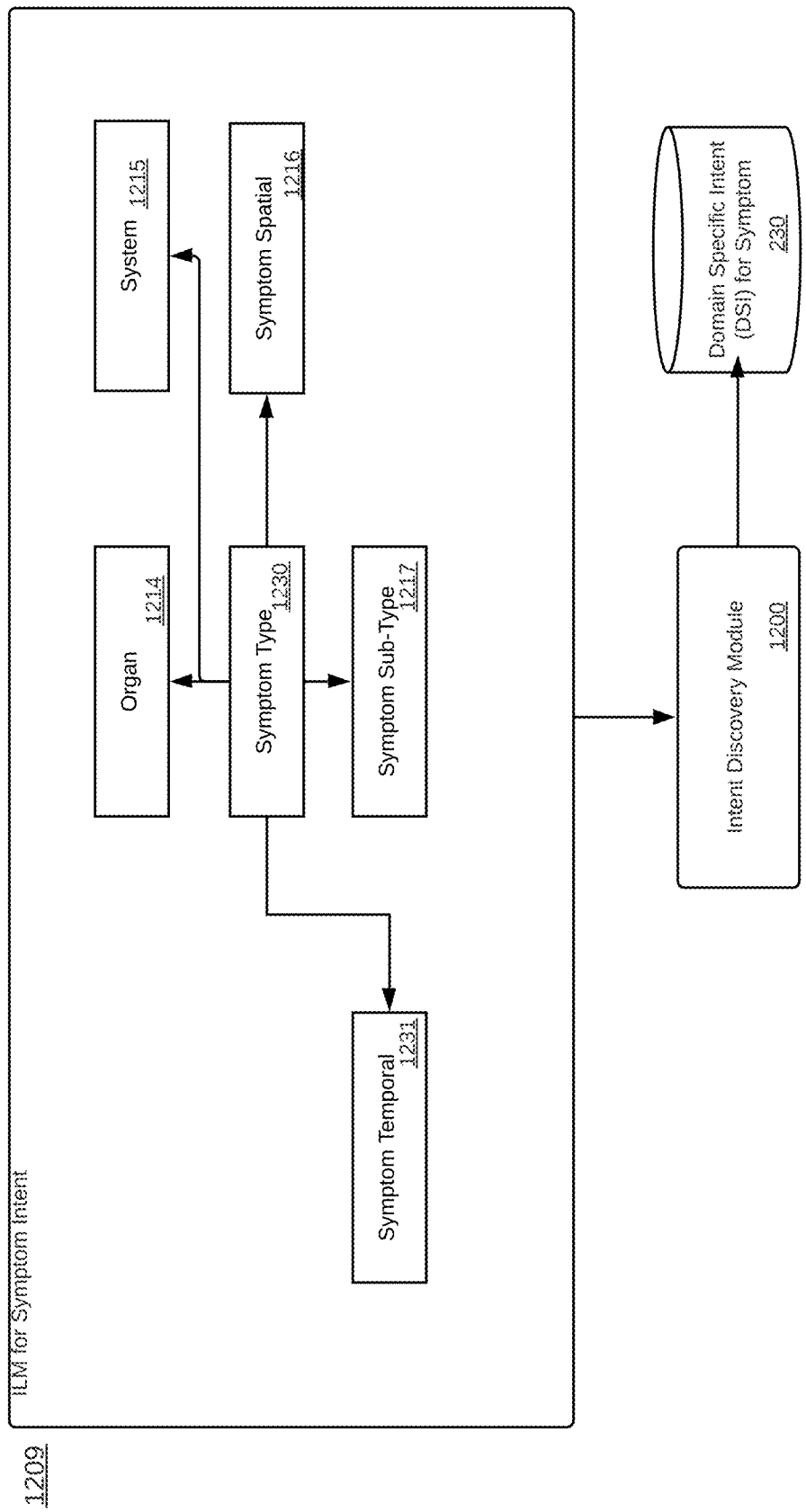
FIG. 12.2

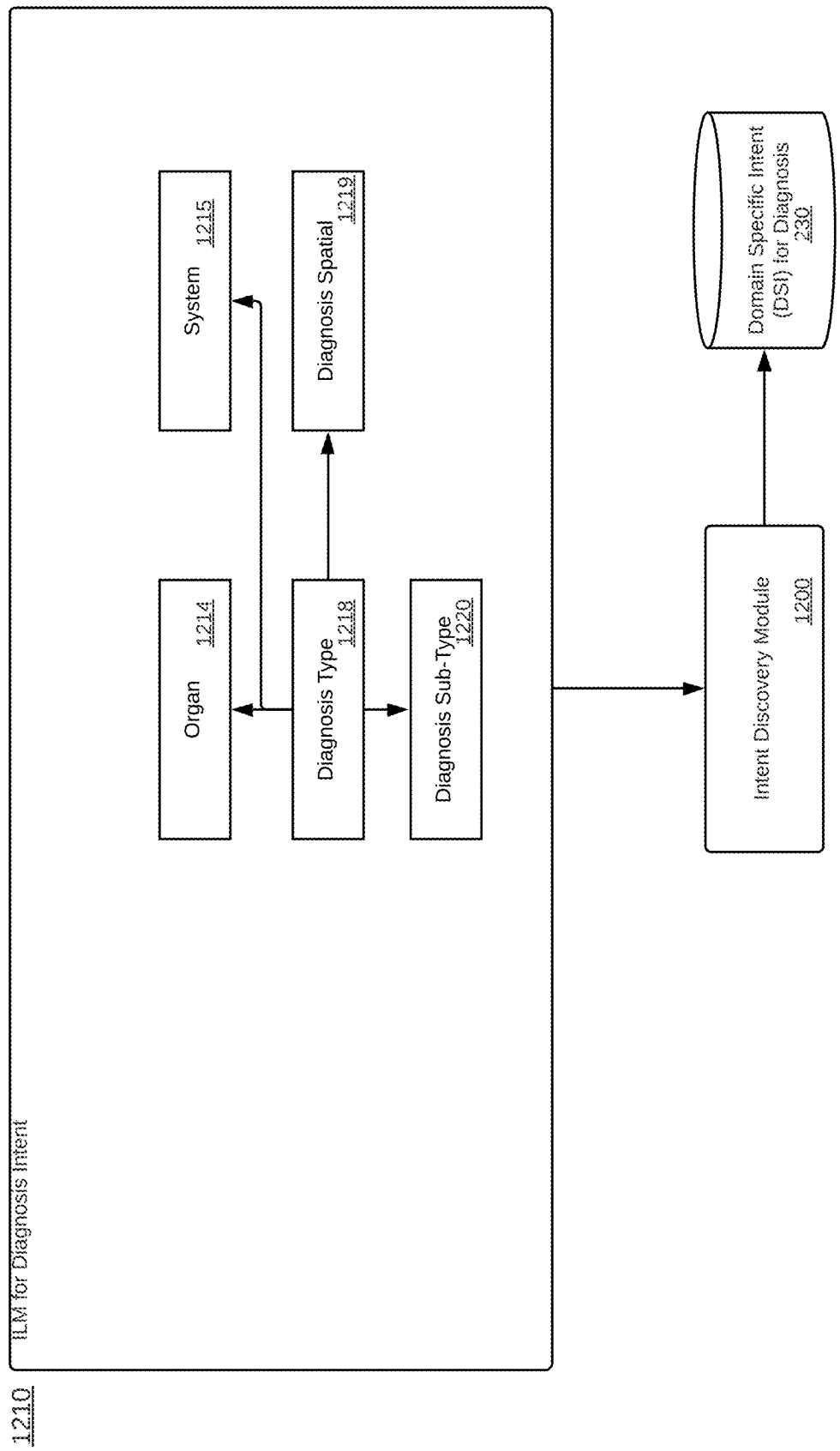
FIG. 12.3

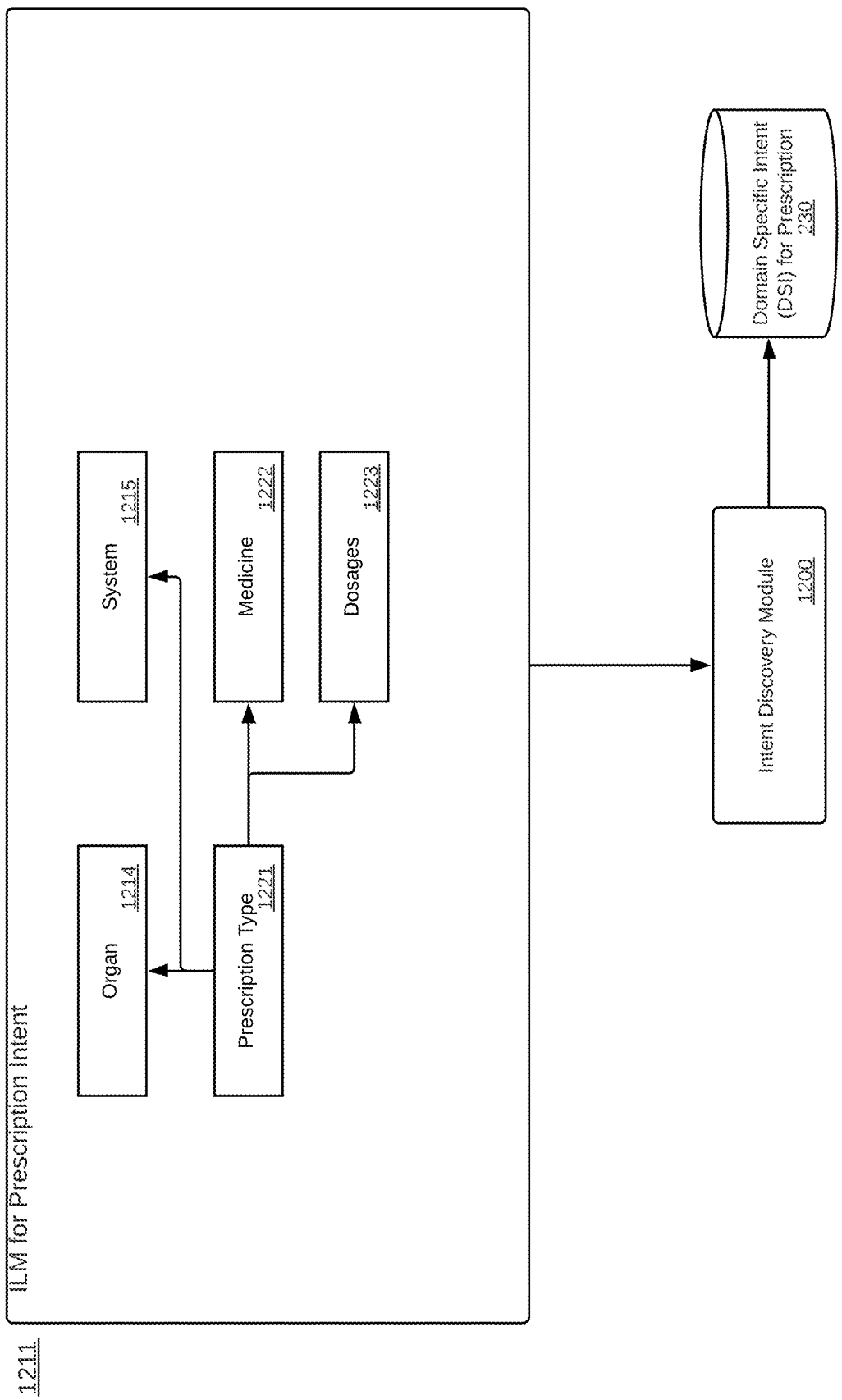
FIG. 12.4

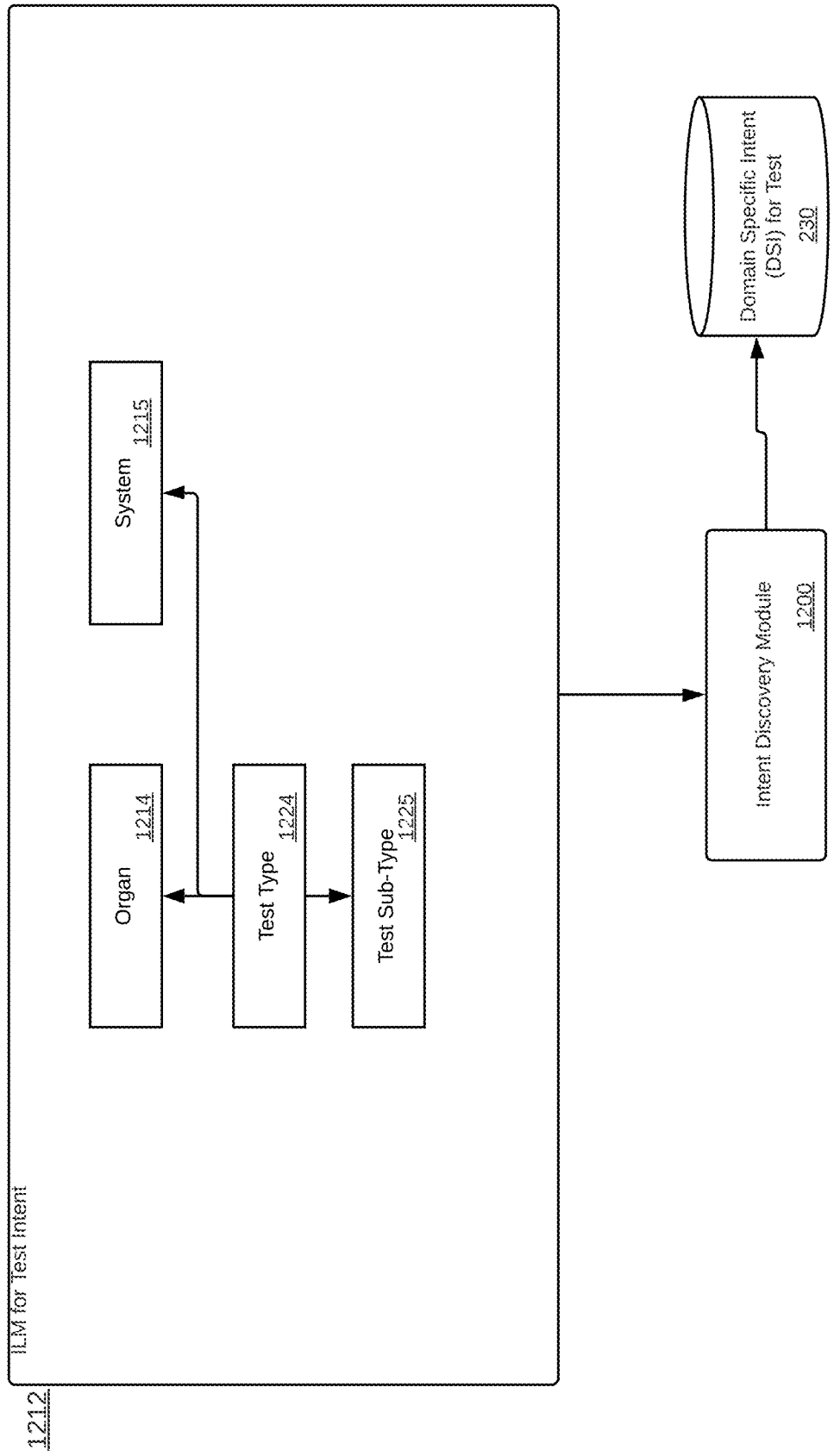
FIG. 12.5

ADAPTABLE SYSTEMS AND METHODS FOR DISCOVERING INTENT FROM ENTERPRISE DATA

This application claims the benefit of U.S. Provisional Application No. 62/745,285, filed Oct. 13, 2018, which is incorporated herein by reference in its entirety.

1.0 FIELD OF THE INVENTION

The disclosed embodiments relate generally to computer systems and methods, and in particular to systems and methods for processing enterprise data.

2.0 BACKGROUND

Machine learning, a branch of artificial intelligence, concerns the construction and study of systems that can learn from data. For example, a machine learning system could be trained to learn to distinguish between email spam messages and non-spam messages. After learning, it can then be used to classify new email messages into spam and non-spam folders.

Machine learning typically deals with representation and generalization. Representation of data instances and functions evaluated on these instances are part of all machine learning systems. Generalization is the property that the system will perform well on unseen data instances; the conditions under which this can be guaranteed are a key object of study in the subfield of computational learning theory.

Natural Language Understanding (NLU) typically deals with understanding the intent behind a query or question being asked, e.g. Google search or query engines suggesting possible interpretations of a question.

Generally, an intent may involve planning, problem solving and decision making. Extracting or discovering an intent behind historical enterprise data is useful, for example, for applying the intent to solving a future problem. Enterprise data, unlike a human conversation, can be, for example, data entered by humans during the operation of an equipment, data generated by equipment, for example, in the form of logs, sensor data generated from on-board computer in a car, diagnostic data generated by diagnostic equipment, finding and observations documented by a human expert in a repair order or medical record or workshop logs, etc.

To date, knowledge discovery from existing information sources inside an enterprise has been the focus of enterprise dataset platforms and business intelligence platforms. However, the challenge of building context of enterprise data in real-time, e.g., as data is streaming as input from end-user applications where the enterprise is selling or providing services through enterprise applications, has long been a challenging and expensive task.

Moreover, available data analysis, processing systems and methods are not capable of interpreting domain specific intent, and they are unable to quickly adapt to a given domain or context of enterprise data of disparate enterprise areas or industries. For example, different types of service repair businesses have different types of information concerning problem reporting, diagnoses, repairs, and service recommendations depending on the type of domain involved, e.g., healthcare, automotive, industrial equipment, consumer appliances, railways, aeronautics, or information technology.

3.0 SUMMARY OF THE INVENTION

Systems and methods described herein improve data-driven decision-making in an enterprise by discovering intent applicable to enterprise domain. An enterprise domain can be any domain, for example, a domain related to agriculture, forestry, fishing and hunting, mining, utilities, construction, manufacturing, wholesale trade, retail trade, transportation (for example, automotive, railways, airlines, spacecrafts, rockets, fleets), warehousing, information technology, finance, insurance, real estate, services (for example, professional, scientific, technical, administrative, support, management, remediation, education, health care, social), arts, entertainment, recreation, accommodation, food, administration, industrial equipment, consumer appliances, aeronautics, any domain requiring equipment to perform a task, or any combination thereof. These domains have assets to perform tasks, for example, a task related to transportation, energy production, food manufacturing, food processing, dish cleaning, human body functions (in healthcare), etc. The data-driven decisions vary based on the enterprise domain and problem. Additionally, enterprise data may relate to different domains including agriculture, forestry, fishing, hunting, mining, utilities, construction, manufacturing, wholesale trade, retail trade, transportation (including automotive, railways, airlines, spacecrafts, rockets, fleets), warehousing, information technology, finance, insurance, real estate, services (for example, professional, scientific, technical, administrative, support, management, remediation, education, health care, social), arts, entertainment, recreation, accommodation, food, administration (for example, public, private), industrial equipment, consumer appliances, aeronautics, cover domain specific information, or any combination thereof. The intent behind the enterprise data can be related to equipment failures, such as symptom, failures, resolutions, or related to parts pricing and availability, or related to cancer diagnosis, such as stage of cancer, type of cancer, or margins, or any combination thereof.

A method and system, or platform, for processing enterprise data, in certain embodiments, is preferably configured to adapt to different domains and analyze data from various data sources to discover intent behind enterprise content. Adaptability of the method and system preferably means an ability to extract domain intent from domain specific enterprise data sources without the need to customize the method and the system for a specific domain. Further, adaptability preferably means continuously improving the quality and quantity of the intent based on continuous processing of newer enterprise data, like a human learning from work experience. An intent may be used to perform an action or make a decision. The platform preferably includes an Intent Language Model (ILM) module to translate domain specific data into defined abstractions. Intent domain discovery model represented as Intent Language Model preferably is a data model representing domain specific data. A method and system preferably is adaptable using the enterprise data to discover intent (based on ILM) comprising of discovery and correlation of similar intent, and/or removing disambiguation from the intent.

In one embodiment, a system is configured to process historical enterprise data with the help of a domain expert, and use an Intent Language Model Management System to update the knowledge graph. A knowledge graph may be used to discover domain specific intent hidden inside the enterprise data. For example, a service repair business has enterprise-specific information about issues or symptoms, diagnoses, recommended actions, repairs, parts, and/or recommendations, depending on the type of domain they deal with, for example, automotive, healthcare, home appliances, electronics, aeronautics, heavy equipment, food equipment, food manufacturing equipment, trains, aerospace, military equipment, construction and heavy duty equipment, mining equipment, manufacturing equipment, robotics, power equipment, and/or plant equipment.

In one aspect, a method of processing enterprise data includes segmenting the enterprise data in segments used to extract intent features and then discover intent patterns. Intent may be expressed in using a language model that allows the pattern recognition engine to discover patterns having a specific meaning for a domain.

In certain embodiments, a method and system is adaptable to interpret, correlate and/or remove ambiguities from domain specific intent. In certain embodiments, a method and/or a system can adapt to and/or learn from a domain or a context of enterprise data, preferably from disparate enterprise areas and/or industries. For example, different types of service repair businesses may have different types of information, for example, related to problem reporting, diagnoses, repairs, and service recommendations depending on the type of domain involved, for example, healthcare, automotive, industrial equipment, consumer appliances, railways, aeronautics, or information technology. For example, a symptom of a disease in healthcare is different from a symptom of a car problem expressed by a consumer, and a vacuum breaker valve in a dishwasher and a mitral valve in the human body have a different purpose, while both may include the term valve, so that the domain or context of health care versus commercial equipment will preferably drive interpret the intent of a valve. Or, for example, a "Replace vacuum breaker" to resolve a "Dishwasher leaking from the bottom" can be a domain specific intent for a dishwasher in the commercial food equipment domain. Or, for example, a "heart valve replacement or repair surgery" is performed to address a patient's "edema of the feet" symptom—can be a domain specific intent for a human heart condition in a cardiology domain.

These, as well as other aspects and advantages, will become apparent to those of ordinary skill in the art by reading the following detailed description, with reference where appropriate to the accompanying drawings. Further, it should be understood that the embodiments described in this overview and elsewhere are intended to be examples only and not to limit the scope of the invention.

4.0 BRIEF DESCRIPTION OF THE DRAWINGS

Example embodiments are described herein with reference to the drawings.

Figure 5:
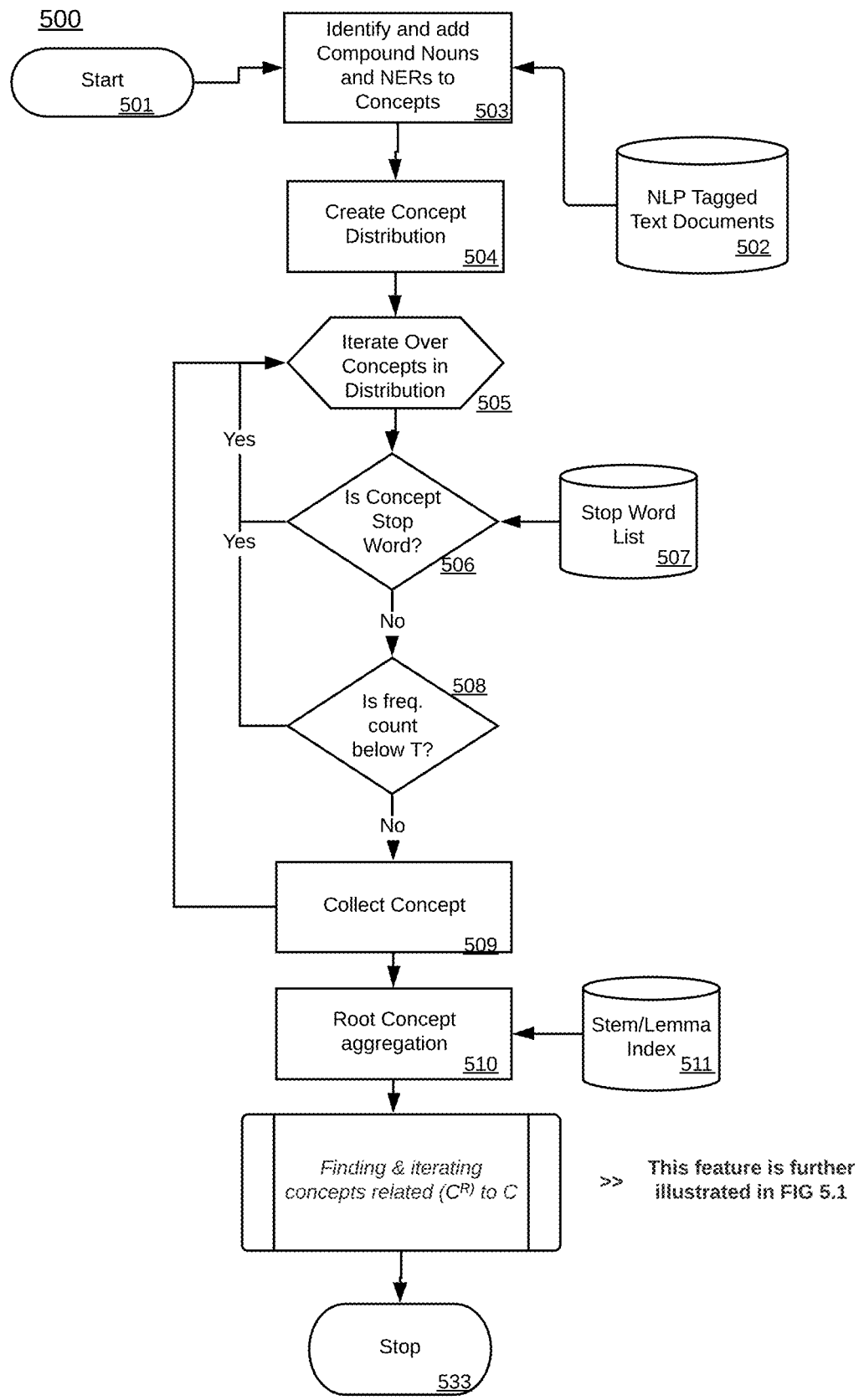

FIG. 5 is a schematic illustration of an Intent-Concept Relationship Discovery (ICRD) in accordance with certain embodiments. FIG. 5.1 is a schematic illustration of finding and iterating concepts related ($C^R$) to C in accordance with certain embodiments and as called out in FIG. 5. FIG. 5.2 is a schematic illustration of finding correlations between C and $C^R$ in accordance with certain embodiments and as called out in FIG. 5.1.

Figure 6:
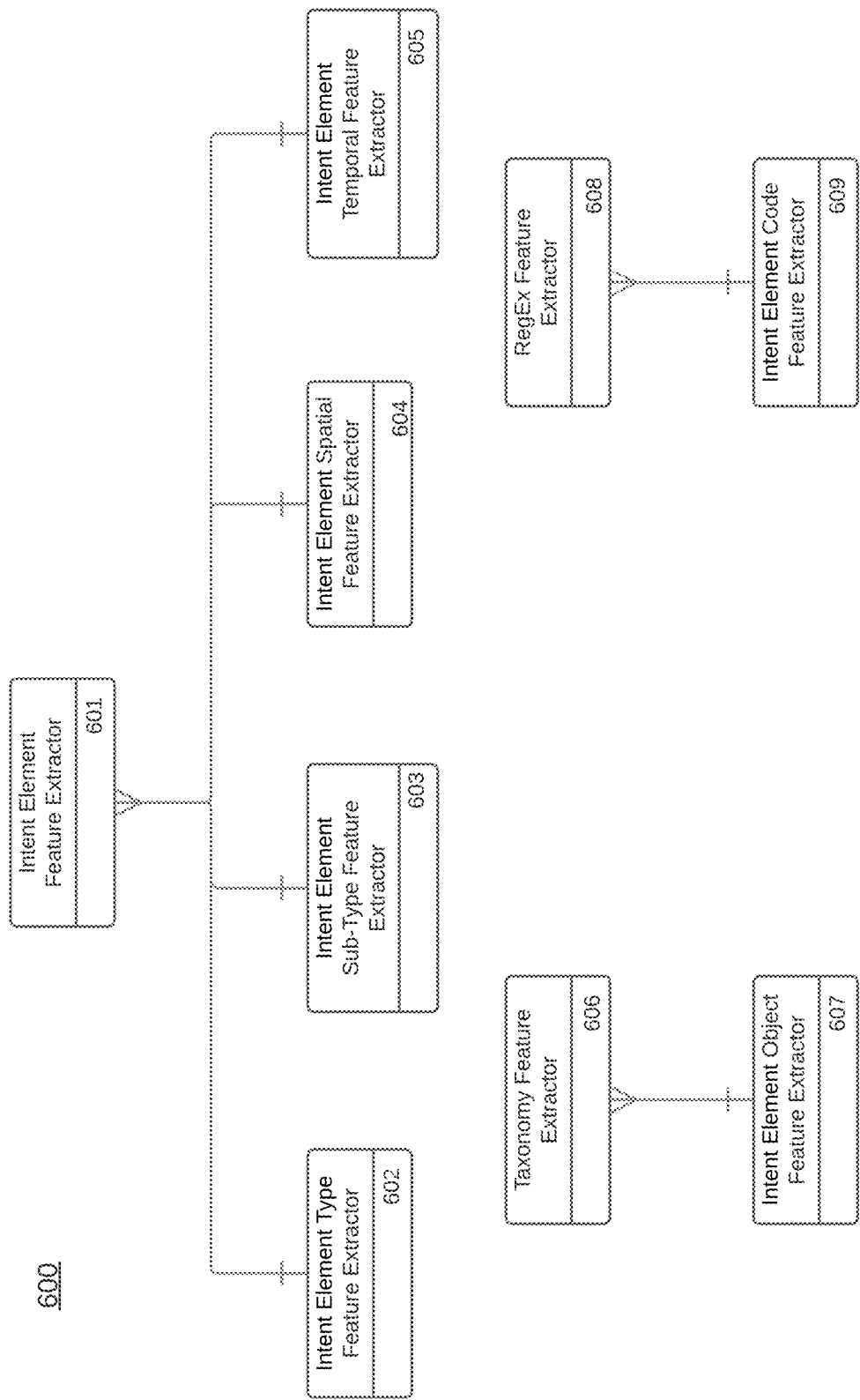

FIG. 6 is a class diagram of an Intent Element Feature Extraction Module in accordance with certain embodiments.

Figure 7:
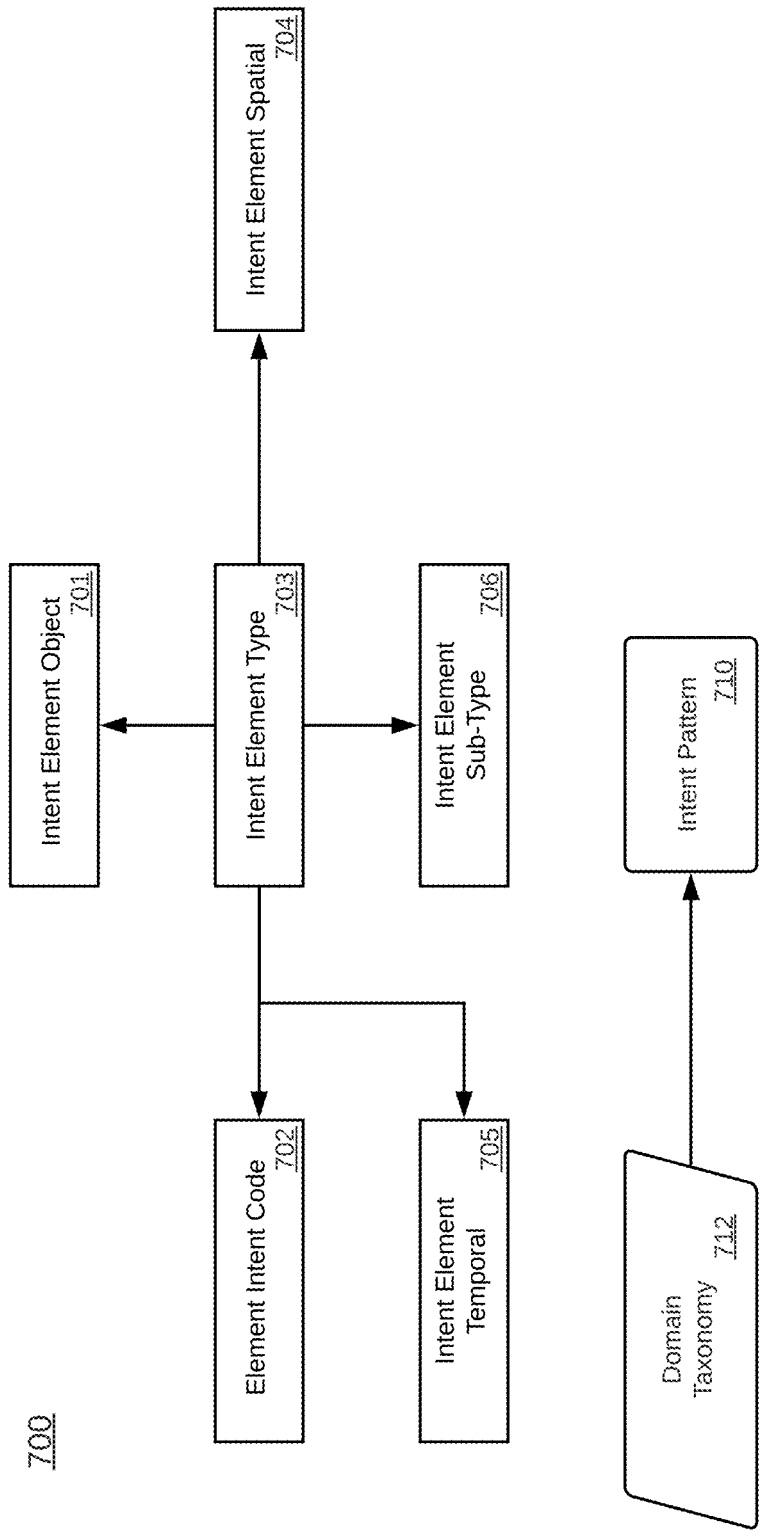

FIG. 7 is a schematic illustration of an Intent Language Model (ILM) in accordance with certain embodiments.

Figure 8:
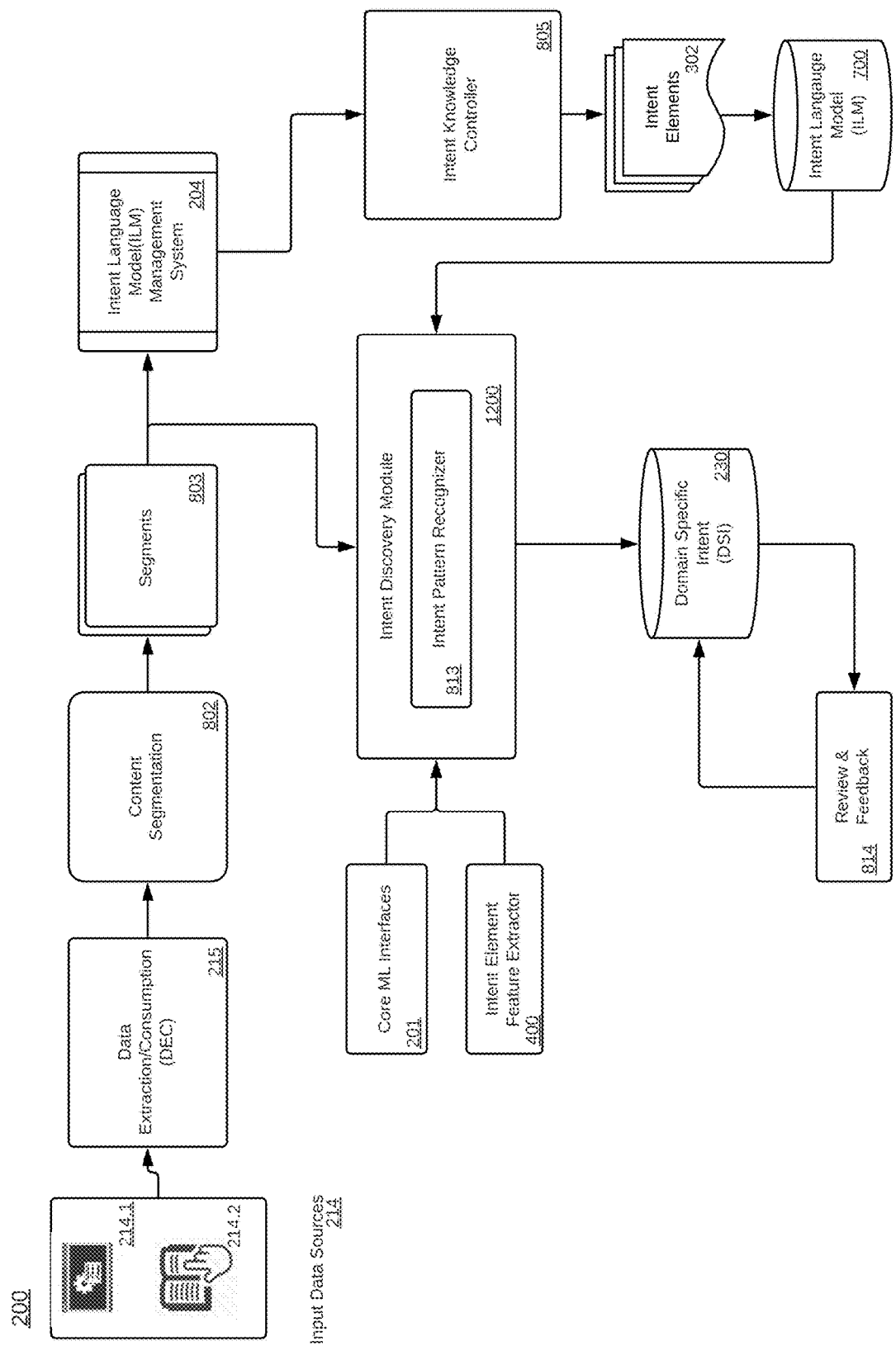

FIG. 8 is a schematic illustration of an Intent Discovery (ID) Core in accordance with certain embodiments.

Figure 9:
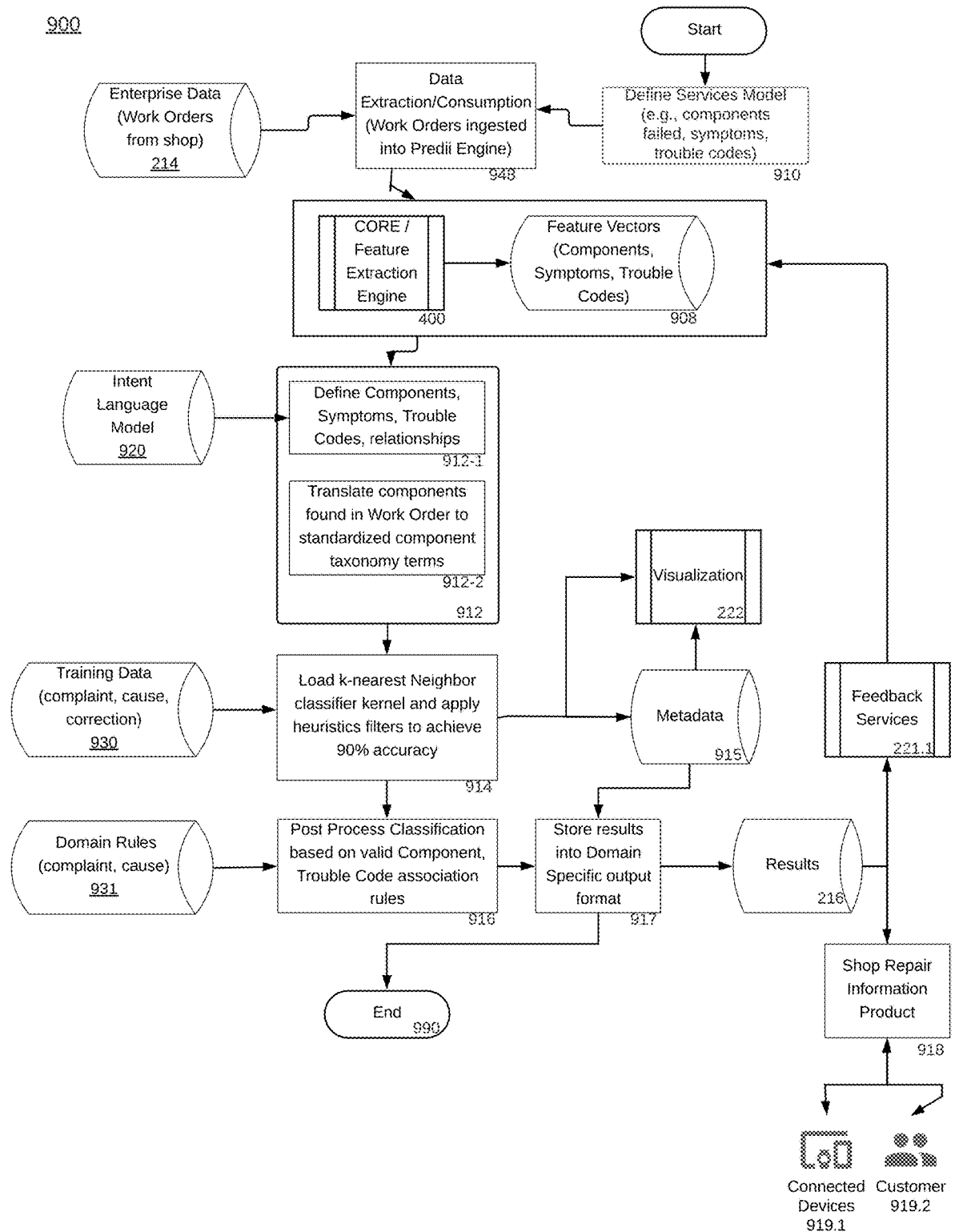

FIG. 9 is a schematic illustration of a Processing of Servicing Data using Intent Discovery (ID) core, in accordance with certain embodiments.

Figure 10:
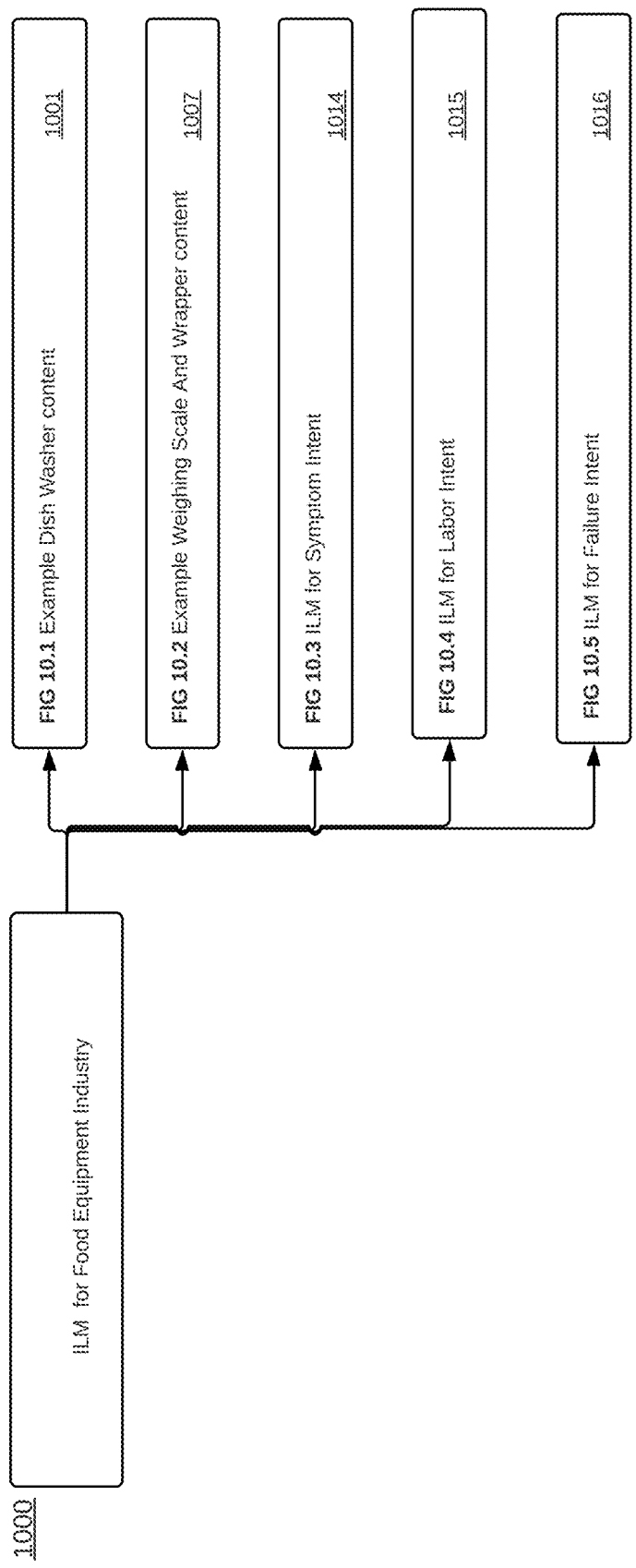

FIGS. 10, 10.1-10.5 are schematic illustrations of examples of an Intent Language Model (ILM) for Food Equipment Industry in accordance with certain embodiments.

Figure 11:
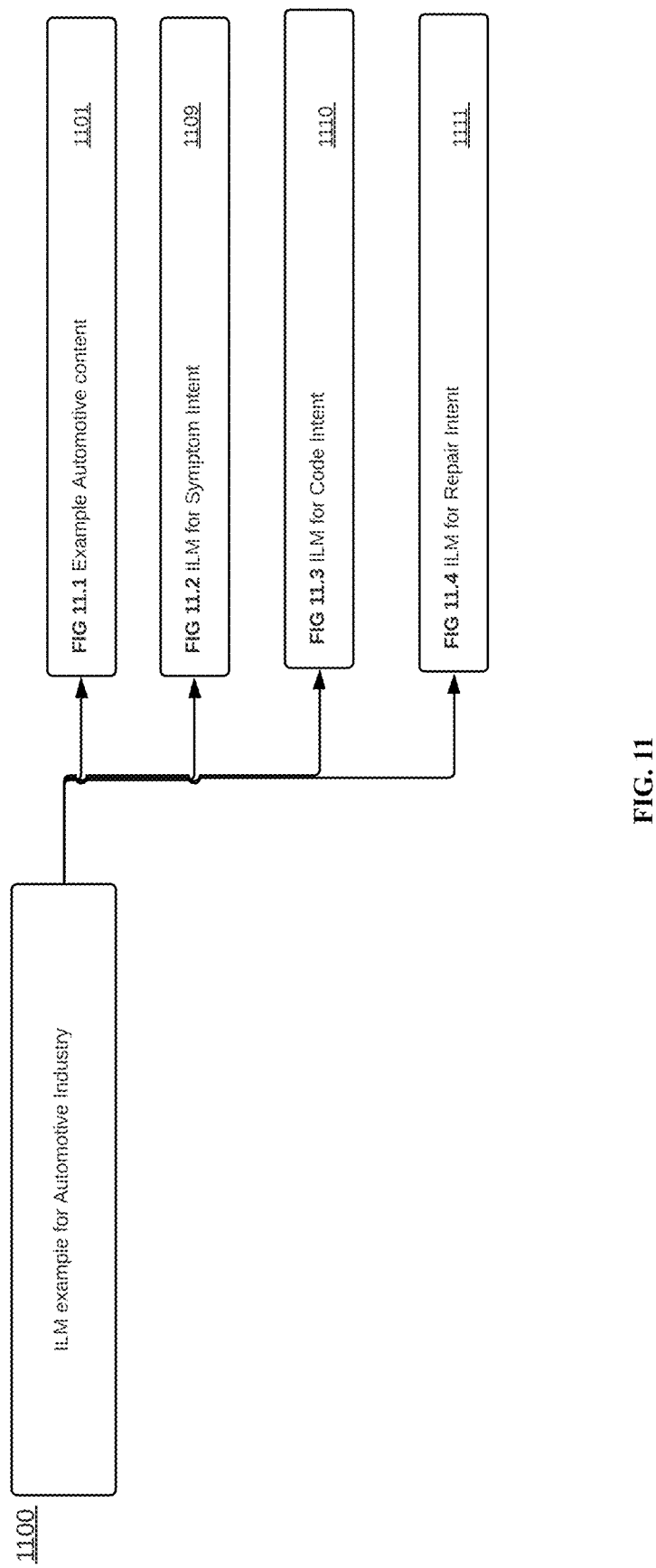

FIGS. 11, 11.1-11.4 are schematic illustrations of examples of an Intent Language Model (ILM) for Automotive Industry in accordance with certain embodiments.

Figure 12:
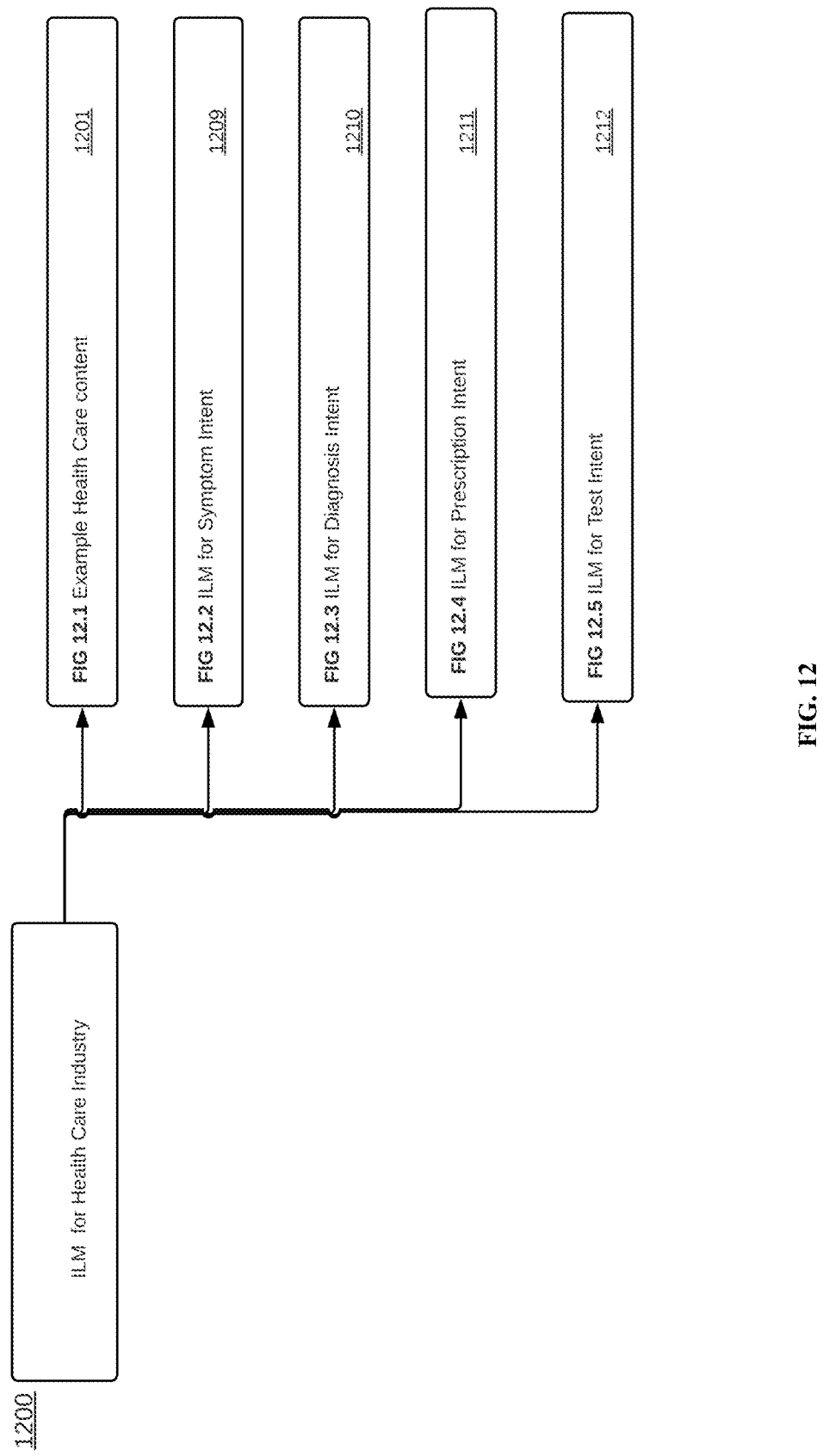

FIGS. 12, 12.1-12.5 are schematic illustrations of examples of an Intent Language Model (ILM) for Health Care Industry in accordance with certain embodiments.

Figure 13:
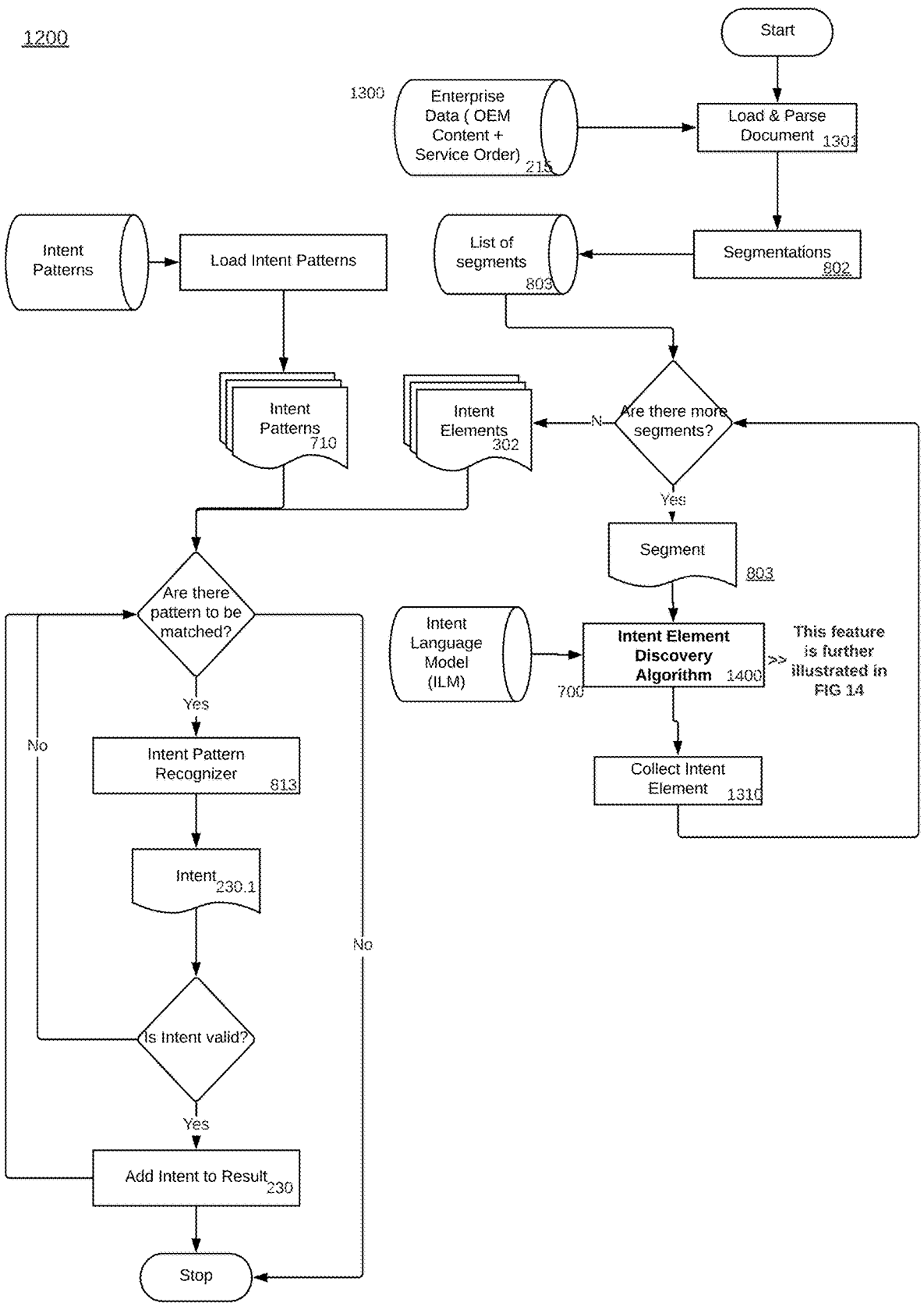

FIG. 13 is a flow diagram of an Intent Discovery Module according to certain embodiments, illustrating processing of enterprise data to discover domain specific intent, in accordance with certain embodiments.

Figure 14:
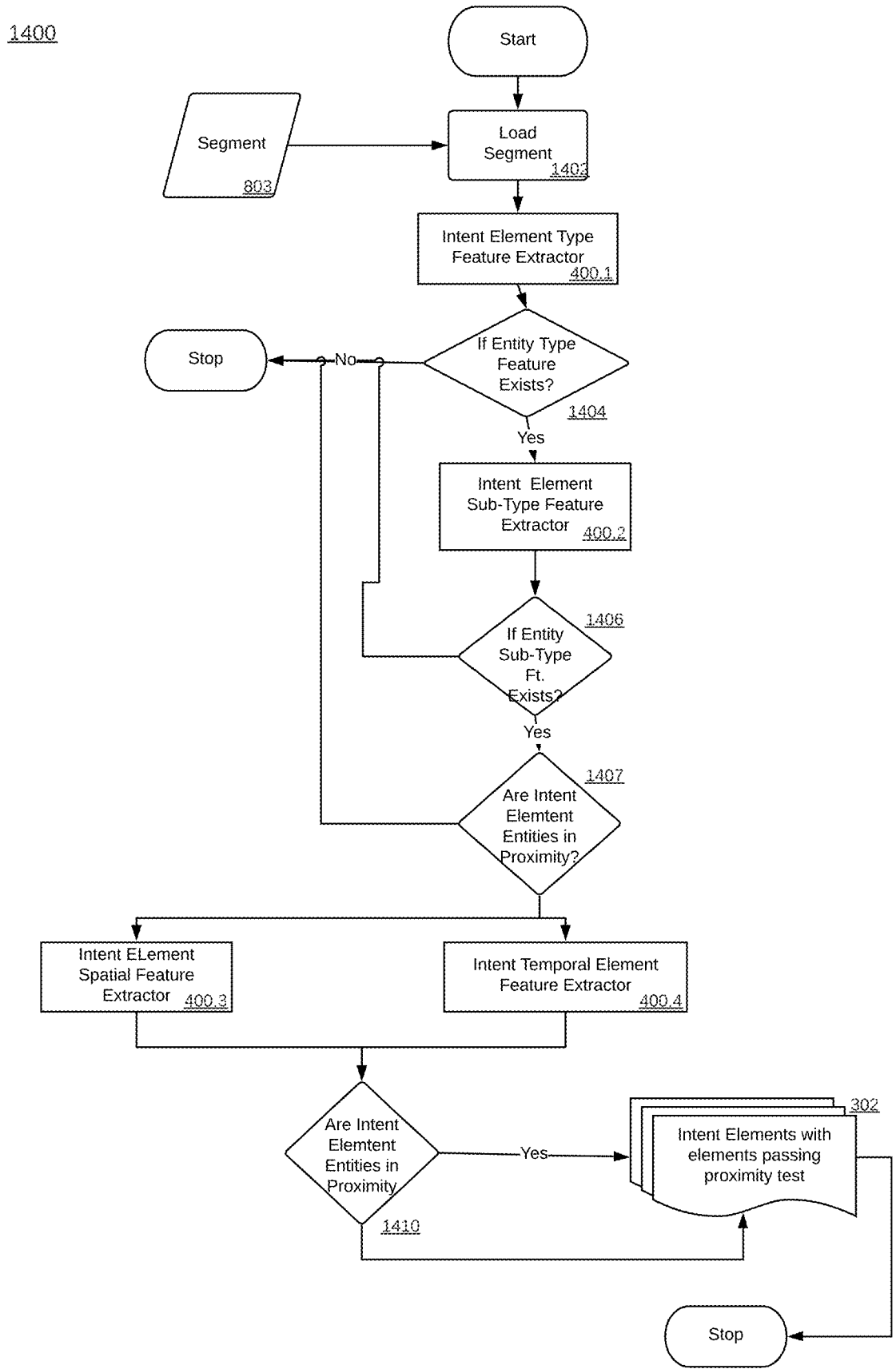

FIG. 14 is a flow chart of an Intent Element Discovery Algorithm in accordance with certain embodiments.

5.0 DETAILED DESCRIPTION OF THE INVENTION

Described herein are machine learning systems and methods for discovering intent from enterprise data. Systems and methods of the current invention, in certain embodiments, are adaptable to desired applications in different domains.

5.1 Overview of Predii Intent Discovery System

In the following description, numerous examples and specific details are set forth in order to illustrate the systems and methods, and those examples and details do not limit the invention in any way.

Figure 1:
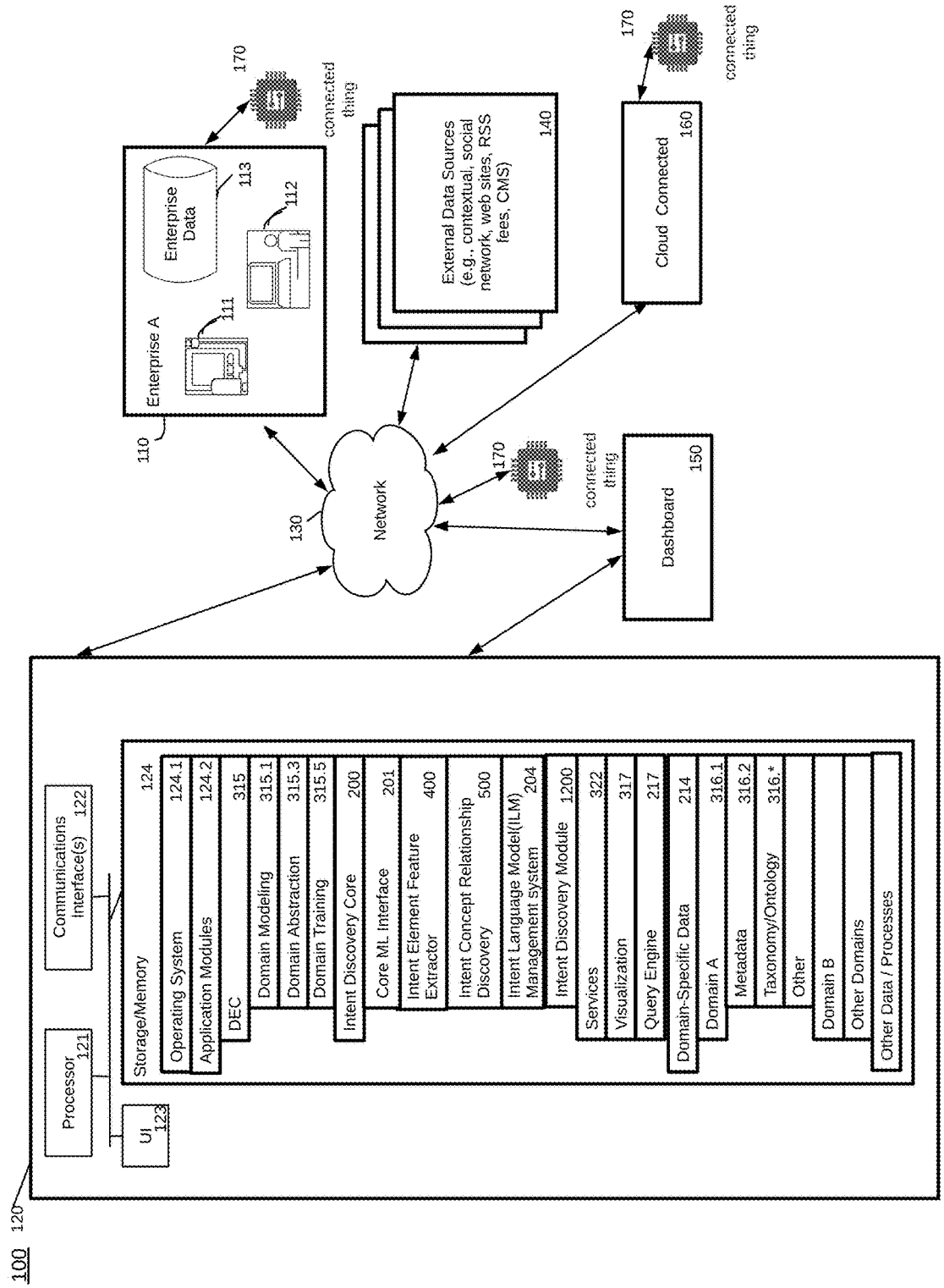
FIG. 1 is a schematic illustration of a Predii Intent Discovery (PID) system according to certain embodiments.

Referring to FIG. 1, a system 100 (also referred to herein as "Predii Intent Discovery (PID) System", or "Platform") according to certain embodiments is illustrated for processing and utilizing enterprise data 113, which may originate from a human expert 112 or a computer inside an enterprise 111 or an asset connected to the enterprise via a network 130. An enterprise 110 may be the originator of enterprise data or cloud connected enterprise data 160 originating from remotely connected things 170 (human, equipment, vehicles, airplane, devices) or network connected things 170.

Methods and systems according to certain embodiments are useful to better understand a domain specific intent. In certain embodiments, methods and systems of the invention are capable of analyzing data from any natural source, such as language, voice signal, visual images, and/or other data and cues that are able to express desire, purpose, and/or intent. Such data generally comprises a richness in meaning, which may be challenging for machine learning to use in order to interpret intent behind said data. These messages often comprise an intent with which the message is transmitted. In certain embodiments, an intent may be a common semantic concept and it may occur across messages in a given domain. In certain embodiments, a message may be a medium to transfer an intent from source to a receiver. In certain embodiments, an intent may be discrete in nature whereas a message may be a superimposition of an intent with noise, emotions and/or biases, for example, individual biases of the human who is trying to interpret the intent. For example, in special industrial equipment like, for example, turbines, the intent behind a machine error log message indicating an error code, may convey different intent to different humans depending on their experiences. Or, for example, in an oncology diagnosis domain, pathologist reviewing biopsy samples are trying to interpret the type, grade, stage of cancer, based on visual and microscopic reviews. However, different pathologists may derive different intents from the same data. The differences can be attributed to their past experience and other subjective factors like patient history, geographic region. A more complex scenario can be where different messages are being received from multiple sources regarding the same problem. For example, a machine log, historical service order, and a technical manual could be addressing the same issue in different ways. For example, in services and operations of Automotive, special equipment like wind turbines, telecommunication equipment at cell towers, rail, autonomous vehicles, aeronautics equipment, a human with experience have to interpret the true intent behind all these messages to discover the domain specific intent like: symptom intent, failure intent and resolution intent. A symptom intent can be answering what actually is the customer complaint. A customer could be complaining about a dishwasher and saying "dishes are spotty" or "dishes are wet", "dishes have soap residue". All of these symptoms can potentially mean same specific intent depending the manufacturer of the dishwasher, model of the dishwasher.

In certain embodiments, a method and system learns and adapts to enterprise data by processing enterprise data to generate domain experience from the data. The domain experience ontology and taxonomy is represented as Intent Language Model (ILM) and is discovered using Intent Concept discovery methods and systems, from the enterprise data and is augmented with subject matter expert with domain experience. An automated review or review by subject matter expert provide feedback on the accuracy of the discovered domain experience for higher accuracy.

In certain embodiments, a system, or platform, for processing enterprise data is setup to receive and analyze data from various data sources and utilizing domain specific models, to discover domain specific intent and provide intent as an enriched result. The platform may include a data extraction and consumption (DEC) module to translate input data sources into defined abstractions, breaking it down for consumption by an available feature extraction engine. An Intent Discovery core engine, which may include a number of existing machine learning modules, such as a feature extraction engine, a classifier and a clusterer, analyzes the data stream and stores metadata that may be used to produce and provide real-time query results to client systems via various interfaces. Intent Discovery core engine can also be responsible for full life-cycle management of a domain specific intent. Life-cycle can start with discovery, creation, update, deletion of domain specific intent. Domain specific intent (DSI) 230 is stored as part of the data results.

In certain embodiments, a method is provided for analyzing data, comprising defining an intent language model for domain specific meaning behind the enterprise data, applying historical enterprise data to build intent language model, extracting intent element features of interest, and storing the domain specific intent metadata. In certain embodiments, a method is provided for analyzing data, comprising discovering an intent language model for domain specific meaning behind the enterprise data, applying historical enterprise data to build intent language model, extracting intent element features of interest, and storing the domain specific intent metadata. In certain embodiments, a method is provided for analyzing data, comprising determining an intent from enterprise data, discovering an action to take in said enterprise based on the determined intent, wherein said action comprises correcting an issue related to said enterprise. In certain embodiments, a method is provided for analyzing data, comprising determining an intent from enterprise data, discovering an action to take in said enterprise based on the determined intent, wherein said action comprises correcting an issue related to said enterprise's critical asset. In certain embodiments, a method is provided for analyzing data, comprising discovering an intent by using an intent language model, wherein said intent language model comprises discovery of an intent, correlation of a similar intent, and removal of ambiguities from the intent. In certain embodiments, a system is provided for analyzing data, wherein the system is capable of analyzing data according to a method for analyzing data as described herein.

5.2 Example Architecture

Figure 2:
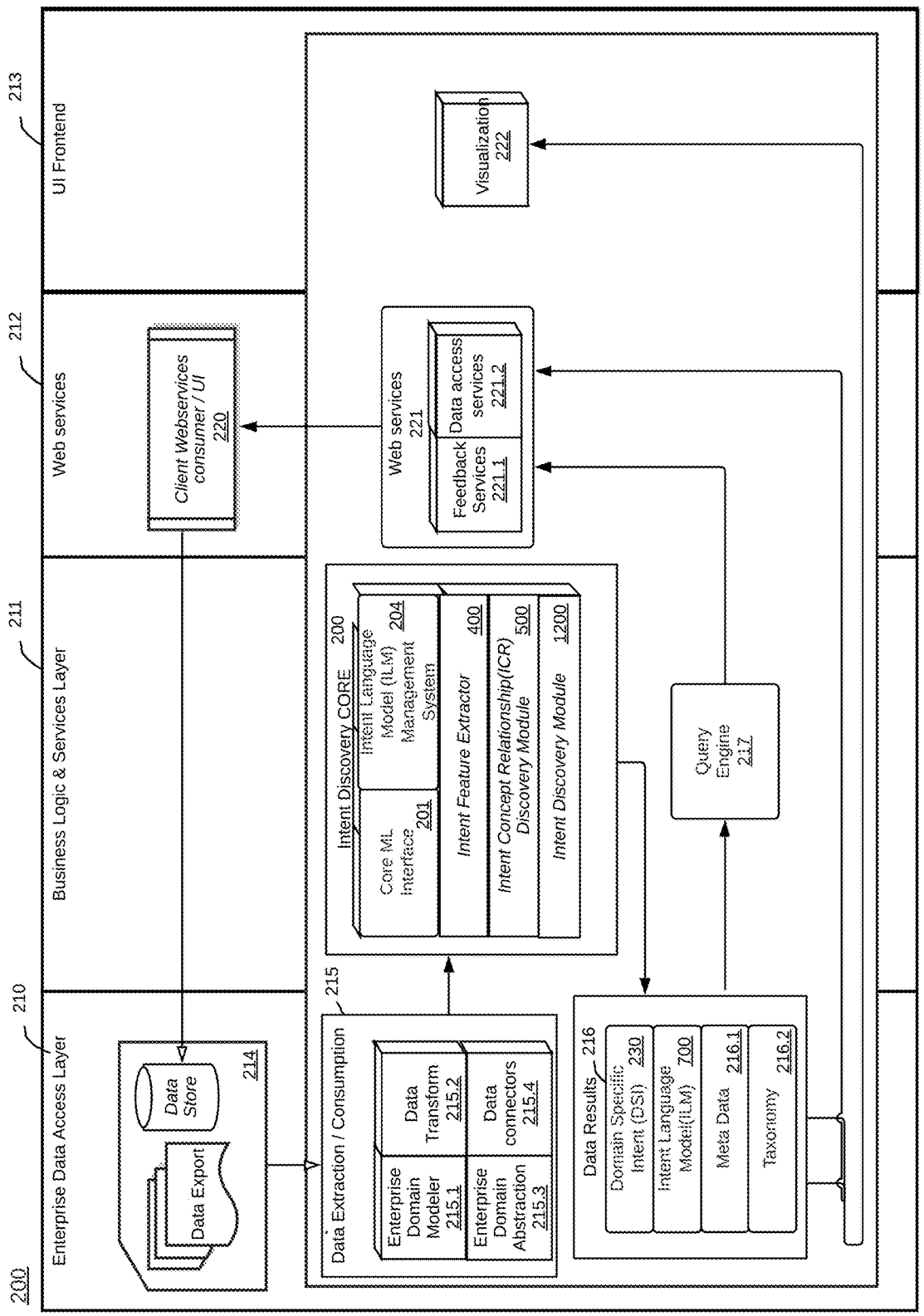
FIG. 2 is a schematic illustration of an architecture of a Predii Intent Discovery system in accordance with certain embodiments.
Figure 3:
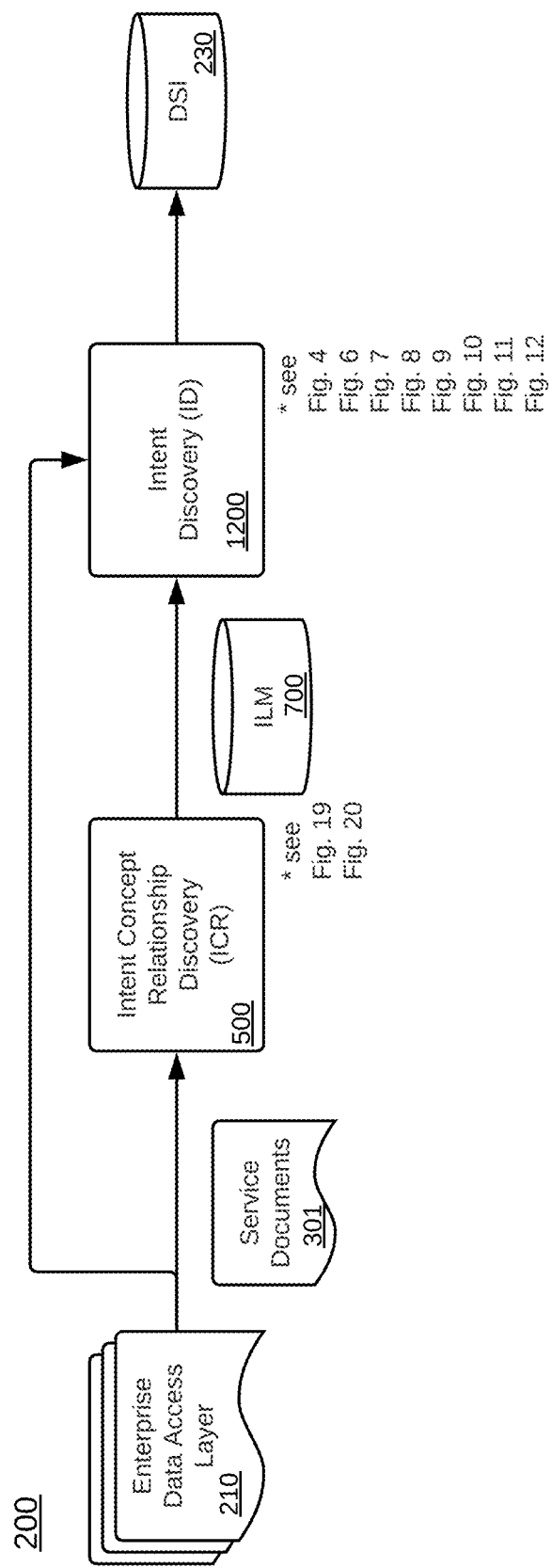
FIG. 3 is a schematic illustration of a processing overview for Predii Intent Discovery Core System in accordance with certain embodiments.

Referring to FIG. 1, in some embodiments, a system 100 (also referred to herein as "Predii Intent Discovery (PID) System", or "Platform"), for processing and utilizing enterprise data may include embodiments exemplified in FIG. 2, including an enterprise data access layer 210, a business logic and services layer 211, web services 212 and a user interface front end 213 (UI Frontend). In some embodiments, a data extraction and consumption (DEC) module 215 may be part of the enterprise data access layer 210, as described herein.

Intent Discovery Core 200 may be both a consumer of domain data and a producer of enriched results and metadata. Modules within core 200 may include Intent Language Model Management System 204, Core ML Interface 201, Intent Feature Extractor 400, Intent-Concept Relationship Discovery 500, Intent Language Model 700, and Intent Discovery module 1200, along with base core proprietary libraries for machine learning such as searcher/indexer, discovery, cluster/classifier, algorithms, and feature extraction.

Intent Element Feature extractor module 400 may be closely associated with a Core Machine Learning (ML) Interface 201 and domain, and may include domain-specific feature extraction parameters, e.g., provided or configured by a domain expert. Intent Element Feature extractor 400 follows a certain structure described in FIG. 4. Certain feature extractor processes that may be implemented by Feature Extractor may include, for example, extraction of Custom Named Entity Recognition 405, Compound Noun Identification 407, Dependency Parser 404, POS Tagging 403, Global Vector Representation 413 and Continuous Vector Representation 415. These and other aspects of Intent Element Feature Extraction module 400 are described in more detail below, for example with respect to FIG. 4.

Core Machine Learning (ML) Interface 201 will also include basic Discovery sub-modules that seek and identify patterns in data. Such patterns may not be otherwise easy to detect as they may be obscured within large volumes of data or by the unstructured nature of enterprise data and/or spread across a number of variables. Intent Language Model Management system 204, Intent Element Feature Extraction module 400 depend on Core Machine Learning (ML) Interfaces 201 module features.

Intent Filters within Core ML enables Intent discovery algorithm to achieve domain specific intent accuracy acceptable for an enterprise problem.

In some embodiments, Intent Discovery Core 200 is a multi-threaded system that dynamically adjusts to the data load, scalable to address future requirements.

Intent Discovery Core 200 interfaces with the enterprise data access layer 210 to persist enriched data via a share datastore (DATA_RESULTS_STORE). Enriched data may include classified data, clustering information, discovered taxonomies, etc. Results data may include meta and trace data indicating the enrichment performed on the data, the enriched data, and identification data correlating back to the original data. The core 200 may act as a producer for the DATA_RESULTS_STORE shared datastore.

DATA_RESULTS_STORE is used by the Query Engine.

Figure 4:
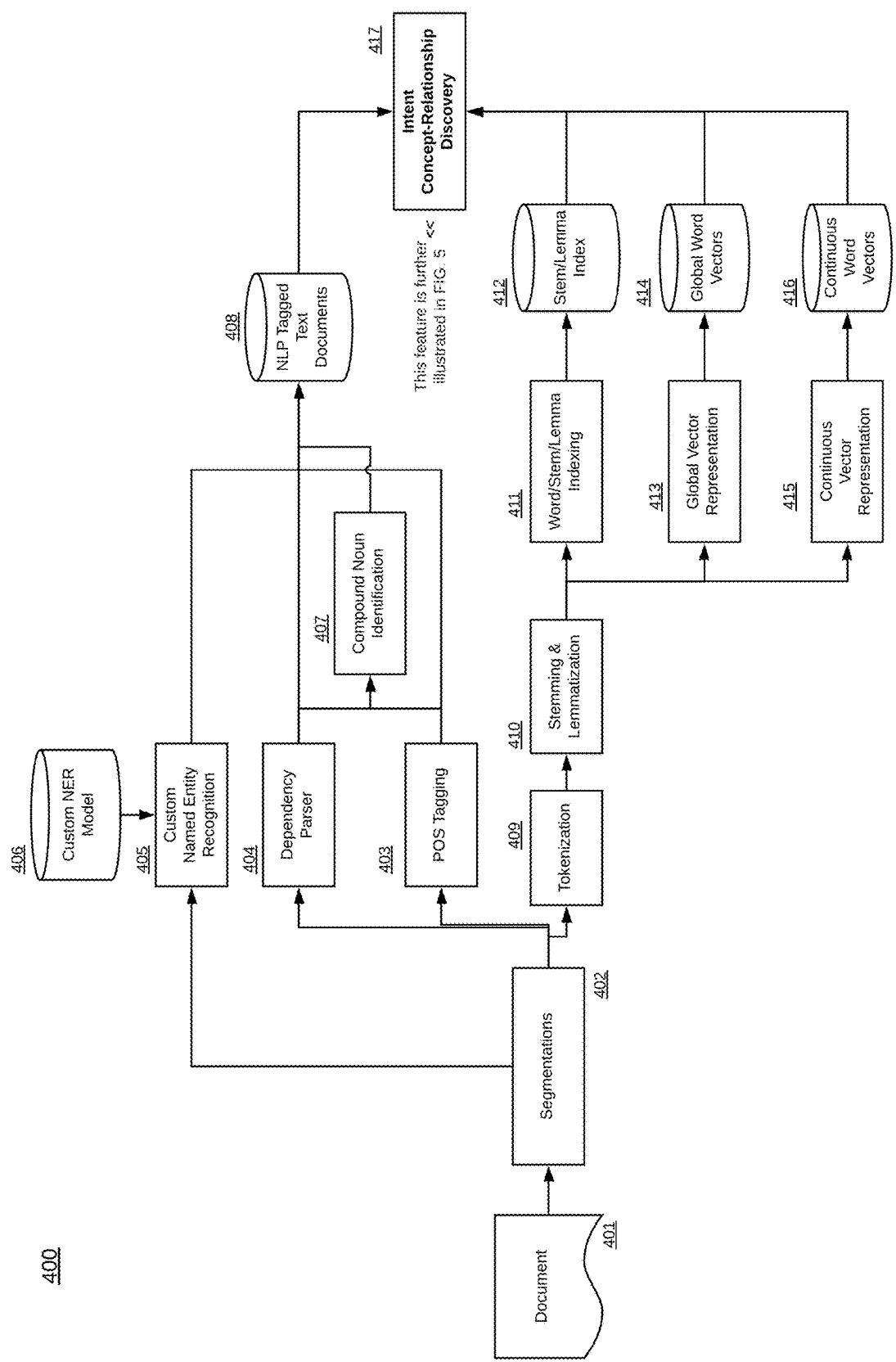
FIG. 4 is a schematic illustration of a method to process Intent Feature Extraction in accordance with certain embodiments.

5.3 Methods of Processing Enterprise Domain Specific Data for Intent Feature Extraction FIG. 4 represents the processing of enterprise data documents using a range of Natural Language Processing (NLP) algorithms, machine learning and neural network algorithms for feature extraction. These features contribute towards Intent-Concept relationship discovery algorithm (FIG. 5).

Segmentation 402 splits texts into blocks of logical units based on the way segmentation is configured. Logical unit can be defined as sentences, phrases or paragraphs. Sentences are created using punctuation based text tokenizer, phrases are created breaking sentences using Parts-of-Speech (POS) tagging and chunking into Noun or Verb phrases. Paragraphs are a collection of sentences, which are distinctly identified based on formatting structure of text document such as new line and tab characters.

POS Tagging 403 describes Natural Language Processing technique for identifying Parts-of-Speech (POS) for the segmented text. The POS tags are stored with the NLP tagged text segments 408.

Dependency Parser 404 describes Natural Language Processing technique for discovering grammatical structure of segments through relationship between tokens.

Custom Named Entity Recognition (C-NER) 405 describes Natural Language Processing technique for recognizing domain/enterprise specific proper nouns. For instance in case of automotive industry, system and component names are enterprise specific entities. C-NER, 405 is powered by Custom NER model 406, which are built over pre-tagged enterprise data using graphical sequence labelling models. A custom named entity stored with the NLP tagged text segments 408.

Compound Noun Identification 407 uses POS Tagging 403 and Dependency Parser 404 to find compound nouns in the enterprise domain data. Compound nouns are two or more words that are joined together to make a single noun, an example of which is "blue tooth speaker", "spark plug" etc. Compound nouns are helpful in finding key domain associated concepts and terms. These compound noun concepts are stored with the NLP tagged text segments 408.

Tokenization 409 describes deconstructing segments into tokens, token could be words or terms as defined by the rules of language and context.

Stemming and Lemmatization 410 describes finding the root word by removing the suffixes, prefixes and inflectional ending. This process produces root words and lemmas, which are indexed.

In order to capture insights into domain knowledge, it is useful to identify key words and relationships between the words. This relationship can be available at a syntactic level in the form of lemmas, for example, "replace" is a lemma for "replaced" and "replacing". This relationship can be captured using words, stems and lemma indexing 411. Such an index is stored in the Stem/Lemma Index, 412. These words may also have a relationship with a domain specific synonym, for example, "BT" may be the same as "Blue tooth" within a specific context. Relationships such as these are captured using Continuous Vector Representation 415, which uses a neural network algorithm to predict which words within the same domain can be inter-replaceable, and these word vectors stored in the Continuous Word Vectors 416. Also, a word can have a correlation with another word and the correlation relationship is captured using Global Vector Representation 413, which uses neural network algorithm to predict correlated words within the same domain, an example is "Bluetooth" and "connect", these correlations are stored in the Global Word Vectors 414.

Intent Concept-Relationship Discovery 417 is described in FIG. 4, which uses natural language processing features and machine leaning features generated in 408, 412, 414 and 416 to discover a relationship between Intent Concepts.

5.4 Algorithm for Intent-Concept Relationship (ICR) Discovery from Extrated Language Features Referring to FIG. 5, Intent-Concept Relationship (ICR) discovery algorithm from input enterprise domain specific data using the language features which are extracted in FIG. 4. Intent Discovery from enterprise data aims at using prebuilt domain knowledge graph to discover intent within the content. Some enterprises could have existing domain knowledge or ability of creating domain knowledge that could be transformed into a domain knowledge graph. Under circumstance where such domain knowledge is not readily available, for a system to be adaptable, it would need an auto-discovery algorithm, which could create domain knowledge graph. Intent-Concept Relationship (ICR) engine, as illustrated in FIG. 5, processes and integrates word-to-word relationships gathered from 406, 412, 414 and 416 to produce a domain knowledge graph database 532. This process is comprised of iterating over all the gathered relationship and applying a predefined set of heuristics and rules to filter out irrelevant relationships and appropriately label/tag the valid relationships. An example of the tags are "synonyms", "Negate Relations", "Object Relations", "Actions Relations" etc.

NLP Tagged Text Document 502 represents a collection of documents containing text segmented as sentences and are annotated with NLP tags such as Parts-Of-Speech (POS), Named-Entities and Syntactic Dependency.

Identify and add Compound Nouns and NERs to Concepts 503 represents identifying Named Entity as Object-Concepts. Also, syntactic dependency may be used to find compound nouns, which may be classified as well as Object-Concepts.

Create Concept Distribution 504 represents doing aggregation on Object-Concepts and words. The distribution would follow Zipf's law.

Iterate Over Concepts in Distribution 505 represents looping over concept sorted based on their frequency count and filtered on threshold limit.

Stop word list 507 represents a list of word(s), which should be ignored from the list of concepts. Default word list can be selected, or custom words list can be externally added.

Is Concept Stop Word 506 represents a filter to eliminate a concept, which is found in a stop word list.

Is Frequency Count below T (threshold) 508 represents low frequency concepts, which are removed to eliminate long tail Zipf's distribution based on threshold limit.

Collect Concept 509 represents a collection of concepts created after filtering.

Stem/Lemma Index 511 represents pre-created index of Root word and its associated Lemma's and work variation. All the stem variations and lemmas are aggregated and associated with its root word.

Root concept aggregation 510 represents aggregation over the root word count by adding count of all stem variations and lemmas and sorting the root concepts on count.

FIG. 5.1 illustrates an iteration over each concept C belonging to a set of all the root Concepts.

Global word vectors 516 is a representation of word based on word-word co-occurrence statistics over the data set. The global vector is learnt using unsupervised neural network and stored for each and every word in the vocabulary.

Cosine Similarity in Global Vector Space 513 represents finding set of words which occur in close proximity of root word C in Global Word Vector space. Cosine similarity is used as distance measure to find nearby words.

Continuous word vectors 515 is a representation of semantically similar words in close proximity. The continuous vector is learnt using unsupervised neural network and stored for each and every word in the vocabulary.

Cosine Similarity in Continuous Vector Space 514 represents finding a set of words, which occur in close proximity of root word C in Continuous Word Vector Space. Cosine similarity is used as distance measure to find nearby words.

Merge, Sort based on frequency count and retain Top-K Related Concepts 517 represents combining close proximity word collected based on cosine similarity in Global and Continuous Word Vector space and sorting them based on aggregated root word counts. This merged set is labeled as $C^R$.

An objective is to find a correlation between the root concept C across concept in the Top-K Related Concept set 517. To do so, Top-K Related Concept is iterated to get concept relationship pair <C, $C^R$>.

Referring to FIG. 5.2, is there significant Correlation between <C, $C^R$> 519 represents a condition to find, if there is a significant statistical co-relationship between C and $C^R$.

Is there statistical significant correlation between pair <C, $C^R$> of type "nominal subject"? 520. If the condition is fulfilled, Create Entity→Action relationship 524 and Update ILM 531.

Is there statistical significant correlation between pair <C, $C^R$> of type "direct subject"? 521. If the condition is fulfilled, Create Entity→Action relationship 524 and Update ILM 531.

Is there statistical significant correlation between pair <C, $C^R$> of type "adjectival modifier"? 522. If the condition is fulfilled, Create Entity→Action relationship 524 and Update ILM 531.

Is there statistical significant correlation between pair <C, $C^R$> of type "negation"? 523. If the condition is fulfilled, Create Entity→Negation relationship 525 and Update ILM 531.

Is there statistically significant support to $C^R$ as Noun and C is Noun? 526. If this condition is fulfilled, Create "Noun Synonym" Relationship 527 and Update ILM 531.

If 526 is False, check if there statistically significant support to $C^R$ as Verb and C is Verb? 528. If the condition is fulfilled, Create "Verb Synonym" Relationship 529 and Update ILM 531.

If 526 and 528 is False, Create "Other Synonym" relationship 530 and Update ILM 531.

5.5 Intent Element Extractor Abstraction

FIG. 6 is an entity class diagram of a data model abstraction 215.3 for machine learning. Enterprise solutions commonly represent their data in-terms of entities and association among these entities via relationships ("ER-representations").

The abstract entity Intent Element Feature Extractor 601 represents the basic functionality the base feature extractor libraries. This includes the Intent Element Feature Extractor for representing Type, Sub-Type, Spatial and Temporal.

Intent Element Type Feature Extractor 602 represents the various types of an intent element, such as a leak, run, shake, pull, and other labor verbs.

Intent Element Sub-Type Feature Extractor 603 represents the sub-type of Intent Element Type Feature Extractor, such as heavy, rough, and other adjectives used to further describe a Type.

Intent Element Spatial Feature Extractor 604 represents the general location of the Intent Element, such as front, back, forward, rear, bottom, top, etc.

Intent Element Temporal Feature Extractor 605 represents the frequency or timing of the Intent Element, such as 'at start', 'in the morning', 'from time to time', 'always', and other phrases to indicate when the Intent Element is experiencing an Intent Element Type.

Taxonomy Feature Extractor 606 represents the generic taxonomy extraction. The Intent Element Object Feature Extractor 607 is a specific implementation of the Taxonomy Feature Extractor.

Regular Expression Feature Extractor 608 represents the generic feature extractor that utilizes regular expression to discover intent. The Intent Element Code Feature Extractor 609 is the specific implementation to discover intent code.

5.6 Intent Language Modeling

FIG. 7 is a representation of the relationships of an Intent Element Object 701 referenced in Intent Element Feature Extraction Module 601 in FIG. 6. It represents how the Domain Specific Intent (DSI) 230 in FIG. 2 is constructed.

An intent element comprises an Intent Element Type 703, Intent Element Sub-Type 706, Intent Element Spatial 704, Intent Element Temporal 705 and Intent Element Code 702 as illustrated in FIG. 7.

Domain Taxonomy 712 is a domain specific resource used to inject domain knowledge into the Intent Discovery core 200. The Intent Pattern 710 is an example of a domain taxonomy built around using regular expression to filter Intent Element Objects 701.

5.7 Intent Discovery Core Engine

FIG. 8 is a system diagram for Intent Discovery Core 200 in FIG. 1. The Input Data Source 214 to this system is any textual data, such as domain manuals 214.2 or service orders 214.1 specific to a domain.

The input data sources 214 is parsed by Data Extraction/Consumption: DEC 215 module and Content Segmentation 802 loads and deconstructs the content into Segments 803 which retains structural information in its representation.

Segments 803 are iterated over to discover intent within the segments using Intent Discovery Module 1200 and Segments 803 are iterated by managing the intent discovered across the segments in Intent Language Model Management System 204.

Intent Language Model Management System 204 uses the Intent Knowledge Controller 805 module to update elements of Intent 302 and Intent to Intent Language Model ILM 700.

Data from a training data set is used to create Segments 803 using Content Segmentation 802 that can be processed by Intent Language Model Management System 204 to find intent elements. These intent elements can be used to enrich Intent Language Model 700 described in FIG. 7.

A real time stream on Input Data Sources 214 produces Segments 803 for Intent Discovery Module 1200.

Intent Language Model 700 is used as external resource to Intent Discovery Module 1200.

Intent Discovery Module 1200 is composed of Intent Discovery using Core Machine Learning (ML) Interfaces 201, Intent Element Feature Extraction Module 400, and Intent Pattern Recognizer 813.

Intent Discovery Module 1200 produces Domain Specific Intent-DSI 230 as output data. The produced Domain Specific Intent is further processed by a Review & Feedback process 814 with both manual reviews by a human subject matter expert or an automated reviewer to improve accuracy and validation.

5.8 Predii Intent Discovery System—Interaction Between Module

As illustrated in FIG. 8, Input Data Source 214 is a text-based data source containing domain specific knowledge from domain related manuals and service records. This content is loaded by Data Extraction/Consumption 215 module.

Content Segmentation 802 module parses the data and represents it into smaller segments 803, these segments could be sentences, phrases or paragraphs base on the configuration. The system iterates over each segment to discover possible intent from each segment.

If input data is training data, then intent elements are obtained from the data through Segments 803 and used to update Intent Language Model Management System 204. The generic intent representation format is in form of Intent Language Model-ILM as illustrated in FIG. 7.

As illustrated in FIG. 7, Intent Language Model-ILM is used as external source of information for discovering intent from real time text data source. For finding intent within each Segment 803, as illustrated in FIG. 8, intent elements are discovered from content using Intent Element Discovery Algorithm 1400 as illustrated in FIG. 14.

As illustrated in FIG. 13 and FIG. 14, Intent Element Discovery Algorithm 1400 produces multiple Intent Elements 302, from which intent could be generated if the element matches predefined patterns. Patterns matched by the Intent Pattern Recognizer 813, as illustrated in FIG. 8, are filtered and produced as intent.

As illustrated in FIG. 14, Intent Element Discovery Algorithm 1400 is comprised of discovering various intent elements, which are required for intent discovery.

These intent elements are comprised of Intent Element Type 703, Intent Element Sub-Type 706, Intent Element Spatial 704, Intent Element Temporal 705 and Intent Element Code 702 as illustrated in FIG. 7.

An intent element 703-706, as illustrated in FIG. 7, may be discovered using Intent Element Type Feature Extractor 400. For discovering each of the intent element type custom, Intent Element Feature Extractor 400 is configured. As in this case, Intent Element Feature Extractor 400.1, Intent Element Sub-Type Feature Extractor 400.2, Intent Element Spatial Feature Extractor 400.3, and Intent Temporal Element Feature Extractor 400.4 are used for extracting Intent Element Type, Sub-Type, Temporal & Spatial features.

Intent element 703-706, as illustrated in FIG. 7, are preferably in close proximity in segments 803 to be considered for discovering Intent 302. The proximity filters are applied in 1407 and 1410, as illustrated in FIG. 14.

5.9 Enterprise Data Examples

The systems and methods described herein may be adapted to model features applicable to any enterprise context, to discover content and to drive classification and clustering of data. Enterprise context can be, for example, service repair data, customer transactional data, server performance data, or various other types of data applicable to an enterprise or an industry, or a particular service or application within an enterprise or industry. For example, a service repair business may have enterprise-specific data, records and other information concerning issues or symptoms, diagnoses, recommended actions, repairs, parts, and/or recommendations depending on the particular domain, e.g., automotive, healthcare, home appliances, electronics, aeronautics.

A. Enterprise Examples

In some embodiments, the systems and methods described herein may be used to process vehicle-service data, such as repair orders pertaining to vehicles repaired at a repair shop. Details of such example embodiments are also disclosed, for example, in U.S. Pat. No. 9,672,497, entitled "Methods and systems for using natural language processing and machine-learning to produce vehicle-service content," and in U.S. Pat. No. 10,157,347, entitled "Adaptable systems and methods for processing enterprise data," all of which are incorporated by reference herein in their entirety. Processing the vehicle-service data can include, but is not limited to, determining a meaning of the vehicle-service intent, generating metadata regarding the vehicle-service data or regarding the meaning of the vehicle-service data, and generating vehicle-service content (e.g., repair information) based, at least in part, on the metadata and a taxonomy defined for use by the system.

In this example, sources of vehicle-service data can include, for example, data from a vehicle repair shop, data from a vehicle manufacturer, or data from a vehicle repair technician. The vehicle-service data can include, for example, data from vehicle repair orders including financial data, parts data, time-series data, or repair procedures.

Processing the vehicle-service data can include, but is not limited to, processing any type or types of vehicle-service data. Any of the vehicle-service data processed by the system can include gibberish. Processing vehicle-service data including gibberish can result in determining a meaning of that vehicle-service data.

FIG. 9 illustrates an example of processing of domain specific servicing data, or work orders, from mechanic shops or other vehicle service centers, in accordance with one or more example embodiments. Domain specific servicing data can originate from servicing of vehicles, industrial equipment, human body, airplane, ship, spacecraft, train, construction equipment, mining equipment, etc. FIG. 9 is an example of a domain-specific embodiment of a method illustrated in FIG. 4.

After the start in FIG. 9, the domain model is defined 910 with annotated features (e.g., components failed, symptoms, and trouble codes), and data extraction/consumption is performed 948 on enterprise data 918, e.g., including work orders, or repair orders, from a repair shop, which are ingested into the Predii engine. A feature extraction engine 400 is used to extract feature vectors 908, e.g., corresponding to components failed, symptoms, and trouble codes. In 912, features are aggregated and scores computed and normalized using component taxonomy 920. This may include, for example, steps to define components, symptoms, trouble codes, and relationship 912-1 and to translate components found in work order to standardized component taxonomy terms 912-2.

As illustrated in FIG. 9, training data 930, e.g., including complaint, cause, and correction data, may be applied to load k-nearest neighbor classifier kernel and apply automotive heuristics filters, to achieve, e.g., 90% accuracy 914. The output of machine learning processes 914 may include metadata 915, which may be used for visualization 222, e.g., for display on dashboard 150 as illustrated in FIG. 1, or may be stored into domain-specific output format 917, e.g., in results store 216, as illustrated in FIG. 9. Alternatively, processed data from 914 may undergo post-process classification 916 for multi-class to single-class data, e.g., using automotive domain post processing rules 931 (e.g., complaint, cause, resolution), and then stored as results into the applicable domain-specific (automotive, healthcare, food processing, railways, etc.) output format 917. For example, such post-processing may involve determining the top five solutions or query answers, possibly with additional ranking, weighing or scoring information.

As illustrated in FIG. 9, results 216 may be accessed or used in response to a query, for example, from a connected device 919.1 or other customer system 919.2 in communication with the System 100 (for example, FIG. 1), e.g., via data access services from a shop repair information product 918. Feedback services 221.1 may be associated with a query engine 217, as illustrated in FIG. 2. Feedback services 221.1 is powered by the Review & Feedback module 814 to automatically improve the Domain Specific Intent. As described herein, such query or feedback may be fed back into core 200 (as illustrated in FIGS. 1, 2, 3, and 8) and processed in 400 to improve learning of the system, or to process a user query and return relevant information.

FIGS. 10.1-10.5 illustrate examples of intent discovery for food equipment industry, for example, intent discovery applied for a dishwasher 1001. For example, when a complaint is reported by a customer, a dispatcher has to decide on the best technician for the job. The decision of the best technician would be based on criteria like their skillset, availability of tools and components required for the job, and their coordinates.

As illustrated in FIG. 10.1, 1001 is a service order for repair of a dishwasher, which has information coming from a user complaint and correction, has technical notes including failures recorded, and repair action performed 1002. Also illustrated are the features 1003, the symptom intent 1004, the failure intent 1005, and the labor intent 1006, as determined using the intent language model according to certain embodiments.

As illustrated in FIG. 10.2, 1007 is a service order for repair of a weighing scale and wrapper, including information regarding the problem and correction of the problem with technical notes including failures recorded and repair action performed 1008. Illustrated are also the features 1009, the symptom intent 1010, the failure intent 1011, and the labor intent 1012, as determined using the intent language model according to certain embodiments.

FIGS. 10.3-10.5 illustrates applications of an Intent Language Model (ILM) for Food Equipment 1013 according to certain embodiments. FIG. 10.3 illustrates discovery of Symptom Intent 1014; FIG. 10.4 illustrates discovery of Labor Intent 1015; and FIG. 10.5 illustrates discovery of Failure Intent 1016 according to certain embodiments.

FIGS. 11.1-11.4 illustrate examples of intent discovery for automotive industry. For example, when a complaint is reported by a customer, a technician decides on a diagnostics procedure to perform for finding the root cause of the problem and resolving it. Quick diagnosis of the issue could be made possible if insights are available on narrowing down on diagnostic steps and recommending resolutions.

FIG. 11.1 describes an example of a typical repair order 1102, which has information coming from user complaint and technical notes including failures recorded and repair action performed. Also illustrated are the features 1103, the code intent 1104, the symptom intent 1105, the failure intent 1106, and the labor intent 1007, as determined using the intent language model according to certain embodiments.

FIGS. 11.2-11.4 illustrates applications of an Intent Language Model (ILM) for Automotive Industry 1108 according to certain embodiments. FIG. 11.2 illustrates discovery of Symptom Intent 1109; FIG. 11.3 illustrates discovery of Code Intent 1110; and FIG. 11D illustrates discovery of Repair Intent 1111 according to certain embodiments.

FIGS. 12.1-12.5 illustrate examples of intent discovery for health care industry. For example, when a complaint is reported by a patient, a doctor decides on a diagnostics test or health checkup to perform in order to find the root cause of the problem and recommend treatments and prescriptions. A fast diagnosis of the problem could be made possible if insights are available on narrowing down on diagnostic steps and recommending resolutions.

As illustrated in FIG. 12.1, 1202 is a patient record, which has information coming from a patient complaint and notes from a doctor, including test performed, diagnosis done and prescription recommended. Illustrated are also the features 1203, the symptom intent 1204, the test intent 1205, the diagnostic intent 1206, and the prescription intent 1207, as determined using the intent language model according to certain embodiments.

FIGS. 12.2-12.5 illustrates applications of an Intent Language Model (ILM) for Health Care Industry 1208 according to certain embodiments. FIG. 12.2 illustrates discovery of Symptom Intent 1209; FIG. 12.3 illustrates discovery of Diagnostic Intent 1210; FIG. 12.4 illustrates discovery of Prescription Intent 1211, and FIG. 12.5 illustrates discovery of Test Intent 1212 according to certain embodiments.

B. Domain Model

The following data examples provide an example of how Predii system adapts to different business problems.

```
IntentElementSchema {
    intentElementSchemaName of type String;
    intentElementSchemaValue of type String;
    intentElementSchemaValueSynonyms of type List<String>;
}
IntentElementSchemaRelation {
    intentElementSchemaRelationName of type String;
    intentElementSchemaFromRelation of type IntentElementSchema;
    intentElementSchemaValueSynonyms of type IntentElementSchema;
}
IntentElement {
    intentElementName of type String;
    intentElementFeatures of type List<Feature>;
}
IntentElementRelation {
    intentElementRelationName of type String;
    intentElementSchemaFromRelation of type IntentElement;
    intentElementSchemaValueSynonyms of type IntentElement;
}
IntenKnowledgeSchema {
        aprioriList of type List<IntentKnowledge>;
        aposterioriList of type List<IntentKnowledge>;
}
IntentKnowledge {
        features of type List<Feature>;
        rules of type List<Feature Rule>;
}
Feature {
        name of type string;
        description of type string;
```

```
}
Feature Rule {
        conditions of type List<Conditions>;
        actions of type List<Action>;
}
Condition {
        Expressions;
        Operators;
        Evaluation;
}
Action {
        Command;
        entities in Domain Data;
}
Domain Data {
        entities of type List<Entity>;
}
Entity {
        attributes of type List<Attribute>;
}
```

Intent Element Schema: In some embodiments, the intent element schema encapsulates an intent schema name, its preferred value as intent schema value, and list of synonyms associated with the intent schema value.

Intent Element Schema Relation: In some embodiments, the intent element schema relation encapsulates relationship name, and the relationship between Intent Element Schema.

Intent Element: In some embodiments, the intent element is instance of intent element schema and has list of features matched.

Intent Element Relation: In some embodiments, the intent element relation is instance of intent element relation schema and has relationship between intent elements.

Intent Knowledge: In some embodiments, the intent knowledge model represents of two types of knowledge base for feature extracting. The first is a priori knowledge, where given a set of predefined results, the system will extract features from the domain data set and systematically match them with existing training data. The second is a posteriori knowledge where the system is trained with the help of domain experts offering specific clues for the system.

Intent Knowledge: In some embodiments, the knowledge data encapsulates a list of features to look for in the domain data set, as defined by domain meta data, and a list of rules to apply to the data.

Feature: In some embodiments the feature model is a description of features that are to be extracted from the domain data set.

Feature Rule: In some embodiments the feature rule contains a set of conditions that must be met before applying the list of actions to the domain data set.

Condition: In some embodiments conditions represent a combination of logic expressions and operators to test for, and an evaluation of those expressions.

Action: In some embodiments actions represent an enrichment to be applied to the data.

C. Domain Model Example a Priori example:

A repair code 123 has known list of a commonly failed components O2 Sensor, Intake Gasket.

```
Knowledge {
        features : [ "code", "component" ]
        feature rules : [ { "code = 123 && component in ('O2 Sensor',
'Intake Gasket')", "set to to matching fix" } ]
}
``` a Posteriori example:

When P0128, P0302, P0304 occurs, focus only on P0128 because if P0128 is cleared, P0302, P0304 automatically gets cleared.

```
Knowledge {
        features : [ "code]
        feature rules : [ { "code in (P0128, P0302, P0304)", "set priority to
P0128 only" } ]
}
``` a Priori example:

A repair code "123" has known list of a commonly failed components: O2 Sensor, Intake Gasket.

```
Knowledge {
        features : [ "code", "component" ]
        feature rules : [ { "code = 123 && component in ('O2 Sensor',
'Intake Gasket')", "set to to matching fix" } ]
}
``` a Posteriori example:

When codes P0128, P0302, P0304 occur, focus only on P0128 because if P0128 is cleared, P0302, P0304 automatically gets cleared.

```
Knowledge {
        features : [ "code]
        feature rules : [ { "code in (P0128, P0302, P0304)", "set priority to
P0128 only" } ]
}
```

D. Additional Intent Knowledge Object Details and Examples

In some embodiments, the domain model and all domain analysis operations to be performed on that model can be found in the IntentKnowledge object. This object specifies all attributes of the domain model, as well as key attributes required for content extraction, attributes used in facet searches, and attributes used in aggregation of data. The object also specifies the operations leading to any insights the platform can extract from the content.

The following is an interface of the top level IntentKnowledge object.

| IntentKnowledge | |
| --- | --- |
| getIdKeys( ) | List<KeyAttribute> |
| getFacets( ) | List<FacetAttribute> |
| getContents( ) | List<ContentAttribute> |
| getNs( ) | String |
| getNsType( ) | String |
| getDomainEnrichments( ) | List<IntentEnrichment> |

Key attributes: These are attributes of the intent object that acts as a key, to uniquely identify the object. This could be single attribute, or a combination of attributes.

Facet attributes: Facet attributes are used for the purposes of indexing and searching.

Content attributes: Content attributes are strings where the data can be found to perform analysis on. Insights into the domain model can be extracted or inferred from these attributes.

Intent Enrichments: Data analysis operations to be performed in sequence on the content attributes Name space: The Domain namespace Name space type: Specific domain object in the namespace JSON Automotive Example

```
{
    "ns": "com.momandpop",
    "nsType": "WorkOrder",
    "attributes": {
        "id": {
            "name": "workId",
            "className":"com.predii.core.model.KeyAttribute"
        },
        "ModelYear": {
            "className":"com.predii.core.model.FacetAttribute",
            "name": "ModelYear"
        },
        "Make": {
            "className":"com.predii.core.model.FacetAttribute",
            "name": "Make"
        },
        "Model": {
            "className":"com.predii.core.model.FacetAttribute",
            "name": "Model"
        },
        "SubModel": {
            "className":"com.predii.core.model.FacetAttribute",
            "name": "SubModel"
        },
        "Engine": {
            "className":"com.predii.core.model.FacetAttribute",
            "name": "Engine"
        },
        "WorkOrderDesc": {
            "className":"com.predii.core.model.ContentAttribute",
            "name": "WorkOrderDesc"
        },
        "Odometer": {
            "name": "Odometer"
        }
    },
    "idKeys": [
        {
            "name": "workId",
            "attributeKind": "KEY",
            "indexable":false,
            "store":true
        }
    ],
    "facetAttributes": [
        {
            "name": "ModelYear",
            "indexable":true,
            "store":false
        },
        {
            "name": "Make",
            "indexable":true,
            "store":false
        },
        {
            "name": "Model",
            "indexable":true,
            "store":false
        },
        {
            "name": "SubModel",
            "indexable":true,
            "store":false
        }
    ],
    "contentAttributes": [
        {
            "name": "WorkOrderDesc",
            "indexable":false,
            "store":false
        }
    ],
    "enrichments": [
        {
            "label": "component",
            "enrichmentType": "TAXONOMY",
            "contentAttributes": [{
                "name": "WorkOrderDesc"
            }],
            "enrichmentConfigs": {
                "taxonomy":"component.taxonomy"
            }
        },
        {
            "label": "code",
            "enrichmentType": "REGEX",
            "cleansers" : [{
                "enrichmentType": "REGEX",
                "enrichmentConfigs": {
                    "regex":"code.noise.regex"
                }
            }],
            "contentAttributes": [{
                "name": "WorkOrderDesc"
            }],
            "enrichmentConfigs": {
                "regex":"code.regex"
            }
        }
    ]
}
```

JSON Automotive Entity Example

```
[
    {
        workId : "11111",
        ModelYear : 2010,
        Make : "Toyota",
        Model : "Sienna",
        SubModel : "LE",
        Engine : "",
        WorkOrderDesc : "Plugged in scan tool. Found P0300. Replaced spark plugs",
        odometer : 55123
    }
]
```

E. Other Domain Examples

As discussed above, the systems and methods described herein are adaptable to process data in a variety of domains. The following is a list of example domains and associated features, but one skilled in the art will appreciate that various other domains may be applied without departing from the scope hereof:

Domain: Healthcare

Problem: Reduce the amount of time spent by insurance processors to determine validity of insurance claim and suggest what is covered, not covered by insurance.

Data: Anonymized health insurance claims data, patient health records.

Features: CPT Code, Cost, Primary Diagnosis, Disease site, Insurance coverage.

Domain: Banks, Loan Processing

Problem: Determine qualification of loan based on loan application. reduce time spent by loan officer in determining loan risk.

Data sources: Credit appraisal, loan application, home appraisal, loan appraiser notes, legal documentation.

Domain: Healthcare Equipment: Radiation Oncology

Problem: Reduce downtime of healthcare equipment such as scanners for radiation oncology.

Data sources: Equipment repair history, technician repair records, records for similar equipment; factory component records.

Features: Tested components, failed components, trouble codes, symptoms, diagnostic information.

Domain: Fleet Management

Problem: Maintaining a stable operations require minimal downtime of fleet (rental cars, trucks); proactive maintenance/guided repair of vehicles lowering maintenance costs and reducing downtime of vehicles.

Data sources: Repair history of fleet, repair history of similar engine vehicles in industry, Real Fix information.

Features: Tested component, failed component, trouble code, symptom, diagnostic information from scanners, telematics data from vehicle.

5.10 CONCLUSION

The foregoing description illustrates various embodiments along with examples of how aspects of the systems may be implemented. The above examples and embodiments should not be deemed to be the only embodiments and are presented to illustrate the flexibility and advantages of the systems as defined by the following claims. In the figures, similar symbols typically identify similar components, unless context dictates otherwise. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the sequence diagrams and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the diagrams, scenarios, and flow charts discussed herein, and these diagrams, scenarios, and flow charts may be combined with one another, in part or in whole.

A block that represents a processing of information may correspond to circuitry that can be configured to perform the specific logical functions of a herein-described method or technique. Alternatively, or additionally, a block that represents a processing of information may correspond to a module, a segment, or a portion of program code (including related data). Functional aspects described as modules need not be arranged or stored as a unit, and may include instructions, routines or program code distributed, stored and executed in any manner. The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random-access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present invention is not to be limited in scope by the specific embodiments described herein, which are intended as single illustrations of individual aspects of the invention, and functionally equivalent methods and components are within the scope of the invention. Indeed, various modifications of the invention, in addition to those shown and described herein, will become apparent to those skilled in the art from the foregoing description. Such modifications are intended to fall within the scope of the appended claims. All publications, including patent documents and scientific articles, referred to in this application and the bibliography and attachments are incorporated by reference in their entirety for all purposes to the same extent as if each individual publication were individually incorporated by reference. The article "a" as used herein means one or more unless indicated otherwise. All headings are for the convenience of the reader and should not be used to limit the meaning of the text that follows the heading, unless so specified.

What is claimed is:

1. A method for analyzing data, comprising:

defining an intent language model for domain specific meaning behind historical enterprise data produced during operation of an enterprise, wherein the historical enterprise data includes data generated by equipment during operation, issues or symptoms reported about the equipment, findings and observations reported by one or more human experts in one or more service records including recommended actions, repairs, parts or recommendations, and wherein the historical enterprise data further includes data associated with a problem;

applying the historical enterprise data to build the intent language model;

extracting intent element features of interest from the historical enterprise data to generate domain specific intent metadata, wherein the domain specific intent metadata includes a root cause of the problem, wherein the root cause is an intent extracted from the historical enterprise data based on the problem; and storing the domain specific intent metadata into a database.

2. The method of claim 1, wherein the historical enterprise data further includes data entered by humans during operation of the equipment.

3. The method of claim 1, wherein the extracting further includes segmenting the enterprise data in segments used to extract intent features and then discover intent patterns.

4. The method of claim 1, wherein the extracting further includes removing ambiguities from domain specific intent.

5. The method of claim 1, wherein the extracting further includes learning from a domain of the enterprise data, wherein the domain includes a disparate enterprise area or industry.

6. A method for analyzing data, comprising:

discovering an intent language model for domain specific meaning behind historical enterprise data produced during operation of an enterprise, wherein the historical enterprise data includes data generated by equipment during operation, and findings and observations by one or more human experts in one or more service records, and wherein the historical enterprise data further includes data associated with a problem;

applying the historical enterprise data to build the intent language model;

segmenting text of the historical enterprise data into logical units having sentences, phrases, or paragraphs;

extracting intent element features of interest from the historical enterprise data to generate domain specific intent metadata, wherein the domain specific intent metadata includes a root cause of the problem, wherein the root cause is an intent extracted from the historical enterprise data based on the problem; and storing the domain specific intent metadata into a database.

7. The method of claim 6, wherein the historical enterprise data further includes data entered by humans during operation of the equipment.

8. The method of claim 6, wherein the extracting intent further includes creating the sentences by using a punctuation based text tokenizer.

9. The method of claim 6, wherein the extracting intent further includes creating the phrases by breaking the sentences by using parts-of-speech tagging and chunking the sentences into noun phrases or verb phrases.

10. The method of claim 6, wherein the extracting intent further includes identifying the paragraphs based on formatting structure of a text document, wherein the formatting structure includes at least a new line character or a tab character.

11. A method for analyzing data, comprising:

determining an intent from historical enterprise data produced during operation of an enterprise, wherein the historical enterprise data includes data generated by equipment during operation, and findings and observations by one or more human experts in one or more service records, and wherein the historical enterprise data includes data associated with a problem, wherein the discovering the intent from historical enterprise data includes using a domain knowledge graph generated by using an auto-discovery algorithm;

discovering a current action to take on enterprise equipment in said enterprise based on the determined intent from historical enterprise data; and wherein said current action comprises correcting an issue or symptom with the enterprise equipment related to said enterprise, wherein the issue or symptom is associated with a root cause of the problem, and wherein the root cause is an intent extracted from the historical enterprise data based on the problem.

12. The method of claim 11, wherein the historical enterprise data further includes data entered by humans during operation of the equipment.

13. The method of claim 11, wherein the determining the intent includes generating domain specific intent metadata, wherein the domain specific intent metadata includes a root cause of the problem, wherein the root cause is an intent extracted from the historical enterprise data based on the problem.

14. The method of claim 11, wherein the enterprise is in a domain that is at least one of agriculture, forestry, fishing, hunting, mining, utilities, construction, manufacturing, wholesale trade, retail trade, transportation, automotive, railways, airlines, spacecrafts, rockets, fleets, warehousing, information technology, finance, insurance, real estate, professional services, scientific services, technical services, administrative services, support services, management services, remediation services, education services, health care services, social services, arts, entertainment, recreation, accommodation, food, administration, industrial equipment, consumer appliances, or aeronautics.

15. The method of claim 11, wherein the auto-discovery algorithm is used because existing domain knowledge is not readily available.

* * * * *